(12) United States Patent
Hara

(10) Patent No.: US 10,526,041 B2
(45) Date of Patent: *Jan. 7, 2020

(54) BICYCLE CRANK ASSEMBLY

(71) Applicant: SHIMANO INC., Sakai (JP)

(72) Inventor: Nobukatsu Hara, Sakai (JP)

(73) Assignee: SHIMANO INC., Sakai (JP)

( * ) Notice: Subject to any disclaimer, the term of this patent is extended or adjusted under 35 U.S.C. 154(b) by 232 days.

This patent is subject to a terminal disclaimer.

(21) Appl. No.: 15/621,994

(22) Filed: Jun. 13, 2017

(65) Prior Publication Data

US 2018/0354580 A1 Dec. 13, 2018

(51) Int. Cl.
| | |
|---|---|
| *B62M 1/36* | (2013.01) |
| *B62M 3/00* | (2006.01) |
| *B62M 9/02* | (2006.01) |
| *B62K 19/34* | (2006.01) |
| *F16C 35/077* | (2006.01) |

(52) U.S. Cl.
CPC .............. *B62M 3/003* (2013.01); *B62M 1/36* (2013.01); *B62M 9/02* (2013.01); *F16C 35/077* (2013.01); *B62K 19/34* (2013.01); *F16C 2326/28* (2013.01)

(58) Field of Classification Search
CPC .......... B62M 1/36; B62M 3/003; B62M 9/02; B62M 3/00; B62M 3/04; B62M 9/12; B62M 9/124; B62K 19/34; F16C 35/077; F16C 2326/28; F16H 55/30; F16H 2055/306; Y10T 72/2164; Y10T 72/2165; Y10T 72/2167

See application file for complete search history.

(56) References Cited

U.S. PATENT DOCUMENTS

| | | | | |
|---|---|---|---|---|
| 4,793,208 | A * | 12/1988 | Bregnard | ............... B62M 1/36 280/236 |
| 6,116,114 | A * | 9/2000 | Edwards | ............... B62M 3/003 280/259 |
| 6,173,982 | B1 | 1/2001 | Westergard | |
| 6,367,352 | B1 * | 4/2002 | Niculescu | ............... B62M 1/36 474/69 |
| 6,463,828 | B1 * | 10/2002 | Soucek | ............... B62M 3/00 403/370 |
| 10,150,533 | B1 * | 12/2018 | Hara | ............... B62M 1/36 |

(Continued)

FOREIGN PATENT DOCUMENTS

| | | |
|---|---|---|
| FR | 2881199 | 7/2006 |
| JP | 2016-196236 | 11/2016 |

*Primary Examiner* — Joseph M Rocca
*Assistant Examiner* — Maurice L Williams
(74) *Attorney, Agent, or Firm* — Mori & Ward, LLP

(57) ABSTRACT

A bicycle crank assembly comprises a sprocket, a crank axle, a movable member, a torque transmitting member, and a bearing structure. The sprocket has a rotational center axis. The crank axle extends along the rotational center axis. The crank axle includes an internal space. The movable member is movably provided in the internal space to move the sprocket in an axial direction of the rotational center axis. The torque transmitting member is to transmit a pedaling torque from the crank axle to the sprocket. The bearing structure is disposed between the movable member and the crank axle to slidably support the movable member in the axial direction. The bearing structure is disposed at a location different from a location of the torque transmitting member in the axial direction.

20 Claims, 16 Drawing Sheets

(56) References Cited

U.S. PATENT DOCUMENTS

| | | | |
|---|---|---|---|
| 2004/0040411 A1* | 3/2004 | Harrington | A43B 5/14 |
| | | | 74/594.6 |
| 2005/0011302 A1* | 1/2005 | Wang | B62L 5/003 |
| | | | 74/594.1 |
| 2013/0008282 A1 | 1/2013 | Johnson et al. | |
| 2015/0020621 A1* | 1/2015 | Kawakami | B62M 6/50 |
| | | | 74/47 |
| 2015/0274253 A1 | 10/2015 | Hara et al. | |
| 2017/0101161 A1* | 4/2017 | Cohen | B62M 11/02 |
| 2017/0167542 A1* | 6/2017 | Hara | B62M 1/36 |
| 2017/0183061 A1* | 6/2017 | Yamamoto | B62M 11/18 |
| 2017/0283006 A1* | 10/2017 | Schuster | B62M 9/14 |
| 2018/0043203 A1* | 2/2018 | Seol | B62M 1/24 |

\* cited by examiner

BICYCLE CRANK ASSEMBLY

BACKGROUND OF THE INVENTION

Field of the Invention

The present invention relates to a bicycle crank assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a crank assembly.

SUMMARY OF THE INVENTION

In accordance with a first aspect of the present invention, a bicycle crank assembly comprises a sprocket, a crank axle, a movable member, a torque transmitting member, and a bearing structure. The sprocket has a rotational center axis. The crank axle extends along the rotational center axis. The crank axle includes an internal space. The movable member is movably provided in the internal space to move the sprocket in an axial direction of the rotational center axis. The torque transmitting member is to transmit a pedaling torque from the crank axle to the sprocket. The bearing structure is disposed between the movable member and the crank axle to slidably support the movable member in the axial direction. The bearing structure is disposed at a location different from a location of the torque transmitting member in the axial direction.

With the bicycle crank assembly according to the first aspect, it is possible to transmit the pedaling torque from the crank axle to the sprocket with the torque transmitting member which is disposed at a position different from a position of the bearing structure. This simplifies a structure of the bicycle crank assembly.

In accordance with a second aspect of the present invention, a bicycle crank assembly comprises a sprocket, a crank axle, a crank arm, a movable member, and a torque transmitting member. The sprocket has a rotational center axis. The crank axle extends along the rotational center axis. The crank axle includes an internal space. The crank arm is attached to the crank axle. The movable member is movably provided in the internal space to move the sprocket in an axial direction of the rotational center axis. The torque transmitting member is to transmit a pedaling torque from the crank axle to the sprocket. The torque transmitting member is coupled to one of the crank axle and the movable member to be stationary with respect to the one of the crank axle and the movable member in the axial direction.

With the bicycle crank assembly according to the second aspect, it is possible to transmit the pedaling torque from the crank axle to the sprocket with the torque transmitting member which is disposed at a position different from a position of a bearing structure. This simplifies a structure of the bicycle crank assembly.

In accordance with a third aspect of the present invention, the bicycle crank assembly according to the first or second aspect is configured so that the torque transmitting member is stationary with respect to the crank axle and is movable with respect to the movable member in the axial direction.

With the bicycle crank assembly according to the third aspect, the torque transmitting member can be easily assembled to the crank axle.

In accordance with a fourth aspect of the present invention, the bicycle crank assembly according to the third aspect is configured so that the movable member includes a groove extending in the axial direction. The torque transmitting member is provided in the groove so as to be slidable along the groove.

With the bicycle crank assembly according to the fourth aspect, the groove allows the torque transmitting member to move relative to the movable member in the axial direction.

In accordance with a fifth aspect of the present invention, the bicycle crank assembly according to the fourth aspect is configured so that the torque transmitting member includes a first surface and a second surface. The first surface faces in a circumferential direction of the rotational center axis. The second surface faces in the circumferential direction. The second surface is provided on a reverse side of the first surface in the circumferential direction.

With the bicycle crank assembly according to the fifth aspect, at least one of the first and second surfaces effectively transmits the pedaling torque to the sprocket.

In accordance with a sixth aspect of the present invention, the bicycle crank assembly according to the fifth aspect is configured so that the movable member includes a first receiving surface and a second receiving surface. The first receiving surface faces in the circumferential direction. The first receiving surface is contactable with the first surface. The second receiving surface faces the first receiving surface in the circumferential direction. The second receiving surface is contactable with the second surface. The first receiving surface and the second receiving surface at least partly provide the groove.

With the bicycle crank assembly according to the sixth aspect, at least one of the first and second receiving surfaces effectively transmits the pedaling torque to the sprocket.

In accordance with a seventh aspect of the present invention, the bicycle crank assembly according to the fifth aspect is configured so that at least one of the first surface and the second surface is inclined relative to a reference plane parallel to the axial direction, the reference plane extending radially outwardly from the rotational center axis.

With the bicycle crank assembly according to the seventh aspect, the inclination of the at least one of the first and second surfaces allows a clearance between the torque transmitting member and a surface of the groove to be changed.

In accordance with an eighth aspect of the present invention, the bicycle crank assembly according to any one of the fifth to seventh aspects is configured so that the torque transmitting member includes a radially outer surface and a radially inner surface. The radially outer surface faces radially outwardly. The radially inner surface faces radially inwardly. The radially inner surface is provided radially on a reverse side of the radially outer surface. The first surface and the second surface are inclined relative to each other to increase a circumferential width of the torque transmitting member from the radially inner surface to the radially outer surface.

With the bicycle crank assembly according to the eighth aspect, the inclination of the at least one of the first and second surfaces allows the clearance between the torque transmitting member and the surface of the groove to be changed.

In accordance with a ninth aspect of the present invention, the bicycle crank assembly according to any one of the fourth to eighth aspects further comprises an adjustment structure configured to change a radial position of the torque transmitting member relative to the groove.

With the bicycle crank assembly according to the ninth aspect, the adjustment structure allows an area of a contact surface between the torque transmitting member and a surface of the groove to be changed. In a case where the contact surface of the torque transmitting member and/or the groove is inclined, the inclination of the contact surface allows a clearance between the torque transmitting member and a surface of the groove to be changed.

In accordance with a tenth aspect of the present invention, the bicycle crank assembly according to the ninth aspect is configured so that the adjustment structure is accessible from an outside of the crank axle.

With the bicycle crank assembly according to the tenth aspect, it is possible to change the radial position of the torque transmitting member without disassembling the bicycle crank assembly.

In accordance with an eleventh aspect of the present invention, the bicycle crank assembly according to any one of the fourth to tenth aspects further comprises a sliding structure provided between the torque transmitting member and the groove.

With the bicycle crank assembly according to the eleventh aspect, the sliding structure reduces a friction between the torque transmitting member and the groove.

In accordance with a twelfth aspect of the present invention, the bicycle crank assembly according to the eleventh aspect further comprises a biasing member to bias the sliding structure toward the groove.

With the bicycle crank assembly according to the twelfth aspect, the biasing member stabilizes a position of the sliding structure relative to the groove.

In accordance with a thirteenth aspect of the present invention, the bicycle crank assembly according to the twelfth aspect is configured so that the biasing member is disposed in the torque transmitting member.

With the bicycle crank assembly according to the thirteenth aspect, it is possible to utilize an inner space of the torque transmitting member as a space for the biasing member.

In accordance with a fourteenth aspect of the present invention, the bicycle crank assembly according to any one of the fourth to thirteenth aspects is configured so that a gap is provided between the torque transmitting member and the movable member in a radial direction of the rotational center axis.

With the bicycle crank assembly according to the fourteenth aspect, the gap reduces an air resistance occurring when the movable member moves relative to the crank axle in the axial direction.

In accordance with a fifteenth aspect of the present invention, the bicycle crank assembly according to any one of the first to fourteenth aspects is configured so that the crank axle includes a first axle end and a second axle end, the crank axle extending between the first axle end and the second axle end along the rotational center axis. The bearing structure is provided between the first axle end and the torque transmitting member.

With the bicycle crank assembly according to the fifteenth aspect, it is possible to utilize a space disposed around an axial center of the internal space for the torque transmitting member.

In accordance with a sixteenth aspect of the present invention, the bicycle crank assembly according to any one of the first to fifteenth aspects is configured so that the movable member is movable relative to the crank axle in a movable range in the axial direction, the bearing structure is movable relative to the crank axle in a bearing movable range in the axial direction. The bearing movable range is smaller than the movable range of the movable member.

With the bicycle crank assembly according to the sixteenth aspect, it is possible to make the bearing structure compact in the axial direction.

In accordance with a seventeenth aspect of the present invention, the bicycle crank assembly according to any one of the first to sixteenth aspects is configured so that the bearing movable range is equal to or larger than 50% of the movable range of the movable member.

With the bicycle crank assembly according to the seventeenth aspect, it is possible to minimize an axial length of the bearing structure.

In accordance with an eighteenth aspect of the present invention, the bicycle crank assembly according to any one of the first to seventeenth aspects further comprises a bushing member arranged circumferentially with the torque transmitting member.

With the bicycle crank assembly according to the eighteenth aspect, the bushing member stably moves the movable member relative to the crank axle in the axial direction.

In accordance with a nineteenth aspect of the present invention, the bicycle crank assembly according to the eighteenth aspect is configured so that the bushing member includes a slit extending in the axial direction. The torque transmitting member is provided in the slit.

With the bicycle crank assembly according to the nineteenth aspect, it is possible to effectively arrange the torque transmitting member and the bushing member in the internal space.

In accordance with a twentieth aspect of the present invention, a bicycle crank assembly comprises a sprocket unit, a crank axle, a crank arm, and a movable member. The sprocket unit includes a sprocket having a rotational center axis. The sprocket unit has a reference surface perpendicular to the rotational center axis. The crank axle extends along the rotational center axis. The crank arm includes a pedal attachment end having an axially outermost surface. The movable member is movably provided with respect to the crank axle to move the sprocket unit from an axially outward position to an axially inward position in an axial direction of the rotational center axis. The reference surface is positioned at an axial position equal to an axial position of the axially outermost surface in a state where the sprocket unit is at the axially outward position or being positioned axially inwardly from the axially outermost surface in the axial direction in the state where the sprocket unit is at the axially outward position.

With the bicycle crank assembly according to the twentieth aspect, it is possible to reduce or prevent interference between the sprocket unit and a leg of a rider even when the sprocket unit moves to the axially outward position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
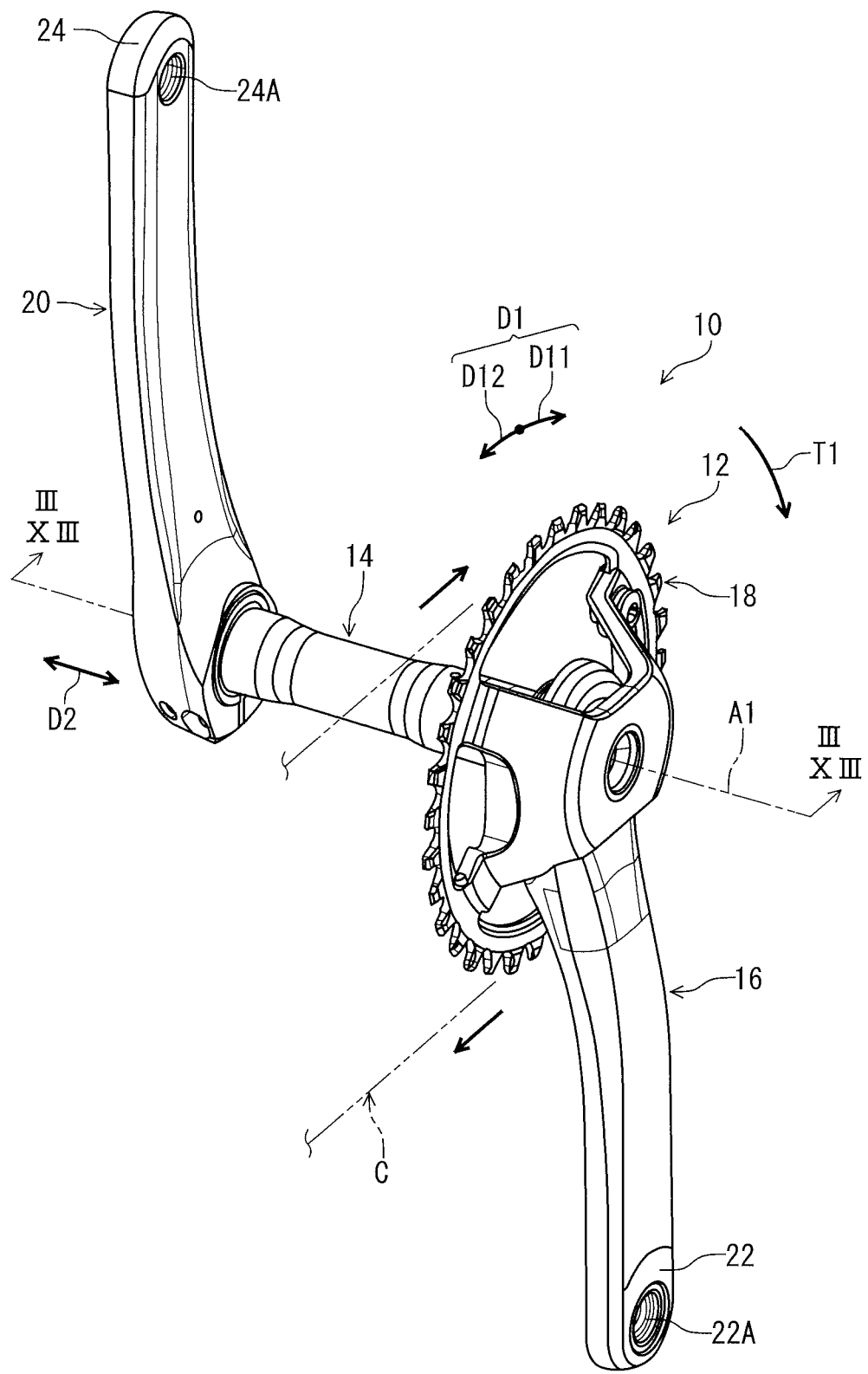
FIG. 1 is a perspective view of a bicycle crank assembly in accordance with an embodiment.

The embodiment(s) will now be described with reference to the accompanying drawings, wherein like reference numerals designate corresponding or identical elements throughout the various drawings.

Referring initially to FIG. 1, a bicycle crank assembly 10 in accordance with an embodiment comprises a sprocket unit 12, a crank axle 14, and a crank arm 16. The sprocket unit 12 includes a sprocket 18. Namely, the bicycle crank assembly 10 comprises the sprocket 18. The sprocket 18 has a rotational center axis A1. The sprocket 18 is engaged with a bicycle chain C. In this embodiment, the sprocket 18 is a single sprocket in the sprocket unit 12. However, the sprocket unit 12 can include a plurality of sprockets.

The crank axle 14 extends along the rotational center axis A1. The crank arm 16 is attached to the crank axle 14. The bicycle crank assembly 10 comprises an additional crank arm 20. The additional crank arm 20 is attached to the crank axle 14. The crank arm 16 includes a pedal attachment end 22. The pedal attachment end 22 includes a pedal attachment hole 22A. A bicycle pedal (not shown) is attached to the pedal attachment end 22 (more specifically, the pedal attachment hole 22A). The additional crank arm 20 includes an additional pedal attachment end 24. The additional pedal attachment end 24 includes an additional pedal attachment hole 24A. An additional bicycle pedal (not shown) is attached to the additional pedal attachment end 24 (more specifically, the additional pedal attachment hole 24A).

The bicycle crank assembly 10 is rotatable relative to a bicycle frame (not shown) about the rotational center axis A1 in a driving rotational direction D11 during pedaling. The driving rotational direction D11 is defined along a circumferential direction D1 of the bicycle crank assembly 10. A reverse rotational direction D12 is opposite to the driving rotational direction D11 and is defined along the circumferential direction D1. A pedaling torque T1 is transmitted from at least one of the crank arm 16 and the additional crank arm 20 to the sprocket unit 12 via the crank axle 14 during pedaling.

Figure 2:
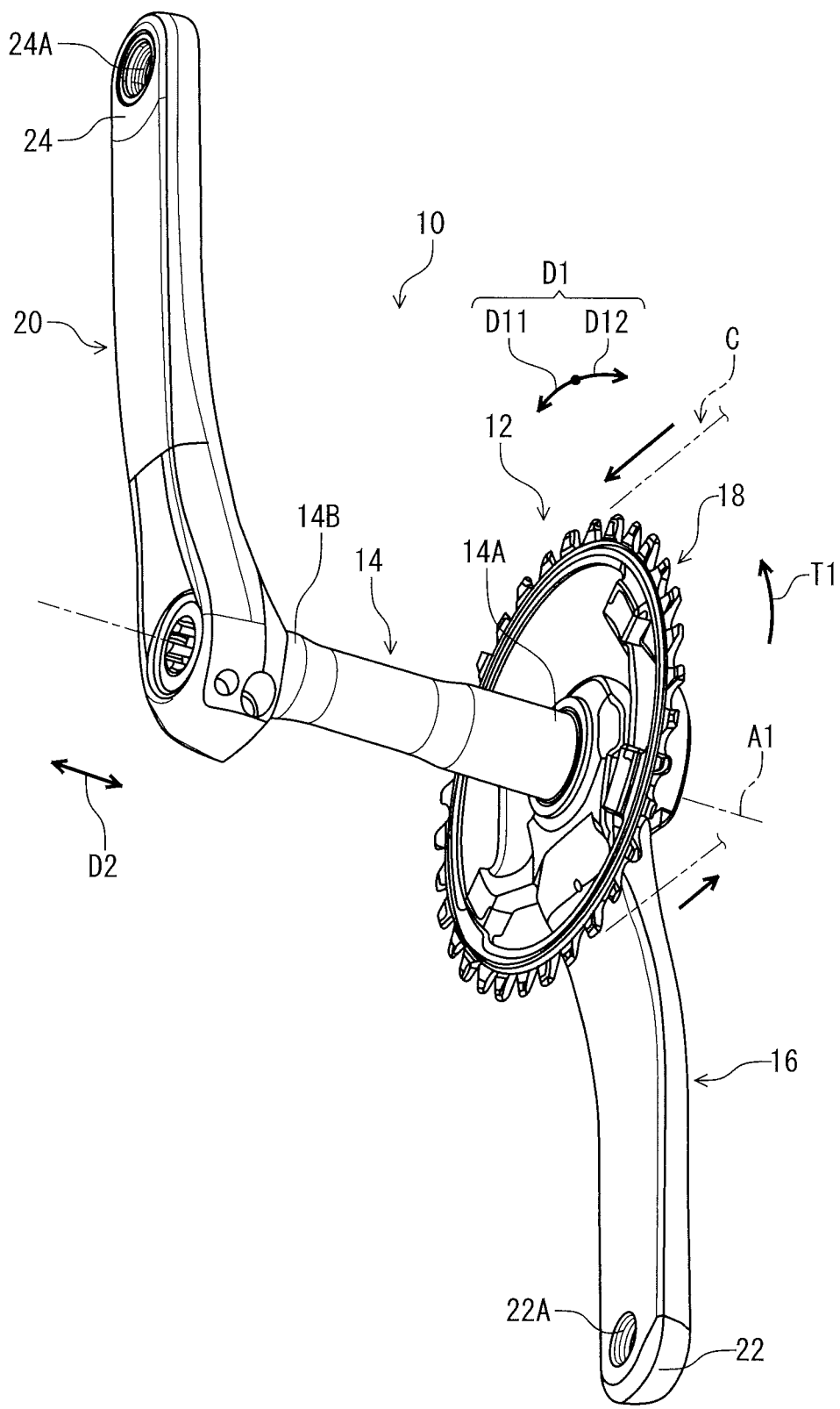
FIG. 2 is another perspective view of a bicycle crank assembly illustrated in FIG. 1.

As seen in FIG. 2, the crank axle 14 includes a first axle end 14A and a second axle end 14B. The crank axle 14 extends between the first axle end 14A and the second axle end 14B along the rotational center axis A1. The crank arm 16 is attached to the first axle end 14A. The additional crank arm 20 is attached to the second axle end 14B. In this embodiment, the crank arm 16 is a right crank arm, and the additional crank arm 20 is a left crank arm. The first axle end 14A is a right end of the crank axle 14. The second axle end 14B is a left end of the crank axle 14. However, the crank arm 16 can be a left crank arm, and the additional crank arm 20 can be a right crank arm.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle crank assembly 10, should be interpreted relative to the bicycle equipped with the bicycle crank assembly 10 as used in an upright riding position on a horizontal surface.

Figure 3:
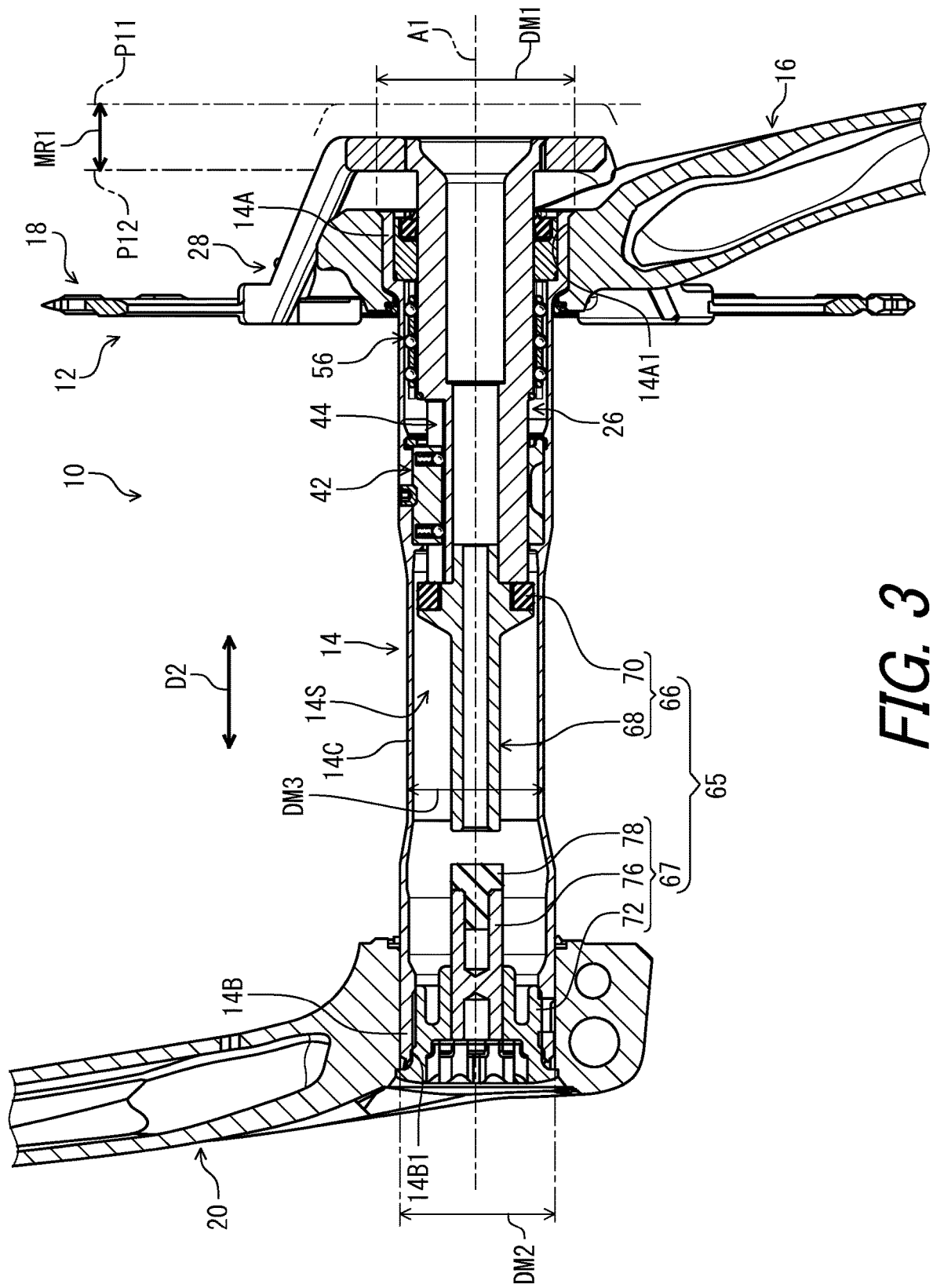
FIG. 3 is a cross-sectional view of the bicycle crank assembly taken along line of FIG. 1.

As seen in FIG. 3, the crank axle 14 includes an internal space 14S. The internal space 14S extends between the first axle end 14A and the second axle end 14B along the rotational center axis A1. The first axle end 14A includes a first end opening 14A1. The second axle end 14B includes a second end opening 14B1. The internal space 14S extends between the first end opening 14A1 and the second end opening 14B1 to connect the first end opening 14A1 to the second end opening 14B1.

The crank axle 14 includes an intermediate part 14C. The intermediate part 14C is provided between the first axle end 14A and the second axle end 14B. The first axle end 14A has a first outer diameter DM1. The second axle end 14B has a second outer diameter DM2. The intermediate part has a third outer diameter DM3. The third outer diameter DM3 is smaller than the first outer diameter DM1 and the second outer diameter DM2. However, the third outer diameter DM3 can be equal to or larger than at least one of the first outer diameter DM1 and the second outer diameter DM2.

The bicycle crank assembly 10 comprises a movable member 26. The movable member 26 is movably provided in the internal space 14S to move the sprocket 18 in an axial direction D2 of the rotational center axis A1. The movable member is coupled to the sprocket 18 to move integrally with the sprocket 18 relative to the crank axle 14 in the axial direction D2. The movable member 26 extends through the first end opening 14A1 of the first axle end 14A.

Figure 4:
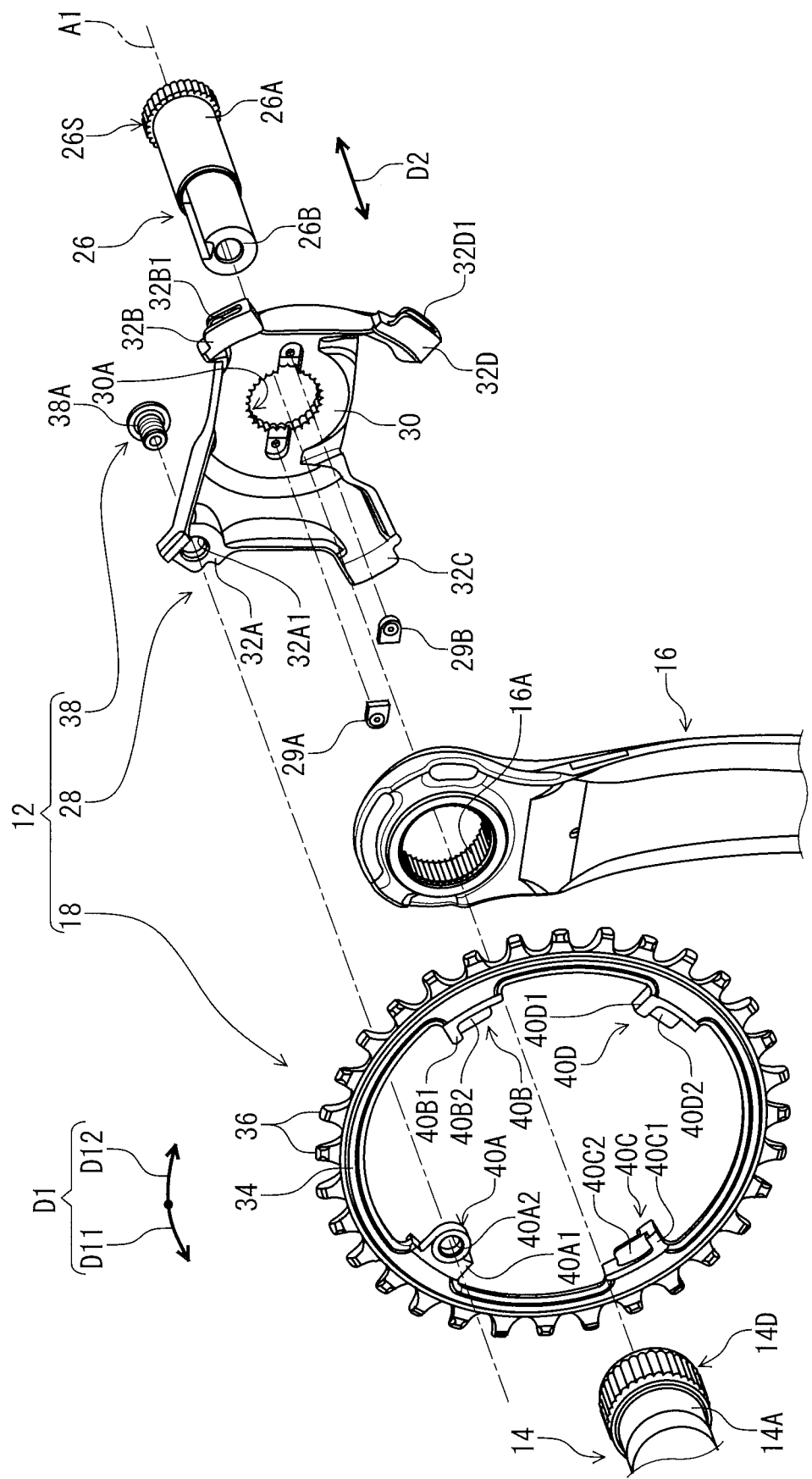
FIG. 4 is a partial exploded perspective view of the bicycle crank assembly illustrated in FIG. 1.

As seen in FIG. 4, the sprocket unit 12 includes an attachment member 28. The sprocket 18 is attached to the attachment member 28. The attachment member 28 includes an attachment body 30, a first attachment arm 32A, a second attachment arm 32B, a third attachment arm 32C, and a fourth attachment arm 32D. The first to fourth attachment arms 32A to 32D extend radially outwardly from the attachment body 30. The first to fourth attachment arms 32A to 32D are spaced apart from each other in the circumferential direction D1.

The movable member 26 includes a first end 26A, a second end 26B, and an external spline 26S. The movable member 26 extends between the first end 26A and the second end 26B. The external spline 26S is provided at the first end 26A. The attachment body 30 includes an internal spline 30A. The external spline 26S meshes with the internal spline 30A to rotate the movable member 26 integrally with the sprocket unit 12. The sprocket unit 12 includes a first restriction member 29A and a second restriction member 29B. The first and second restriction members 29A and 29B are attached to the attachment member 28 to restrict a relative movement between the sprocket unit 12 and the movable member 26 in the axial direction D2.

The sprocket 18 includes a sprocket ring 34, a plurality of sprocket teeth 36, a first coupling part 40A, a second coupling part 40B, a third coupling part 40C, and a fourth coupling part 40D. The plurality of sprocket teeth 36 extends radially outwardly from the sprocket ring 34. The first to fourth coupling parts 40A to 40D extends radially inwardly from the sprocket ring 34. The first to fourth coupling parts 40A to 40D are spaced apart from each other in the circumferential direction D1. The first coupling part 40A is attached to the first attachment arm 32A. The second coupling part 40B is attached to the second attachment arm 32B. The third coupling part 40C is attached to the third attachment arm 32C. The fourth coupling part 40D is attached to the fourth attachment arm 32D.

In this embodiment, the sprocket unit 12 includes a sprocket fastener 38 such as a screw or a rivet. The sprocket ring 34 is secured to the attachment member 28 with the sprocket fastener 38. The first coupling part 40A is secured to the first attachment arm 32A with the sprocket fastener 38. The first coupling part 40A includes a circumferential stopper 40A1 and a coupling threaded hole 40A2. The first attachment arm 32A includes a through-hole 32A1. The sprocket fastener 38 includes an externally threaded part 38A. The sprocket fastener 38 extends through the through-hole 32A1 of the first attachment arm 32A. The externally threaded part 38A is threadedly engaged with the coupling threaded hole 40A2.

Figure 5:
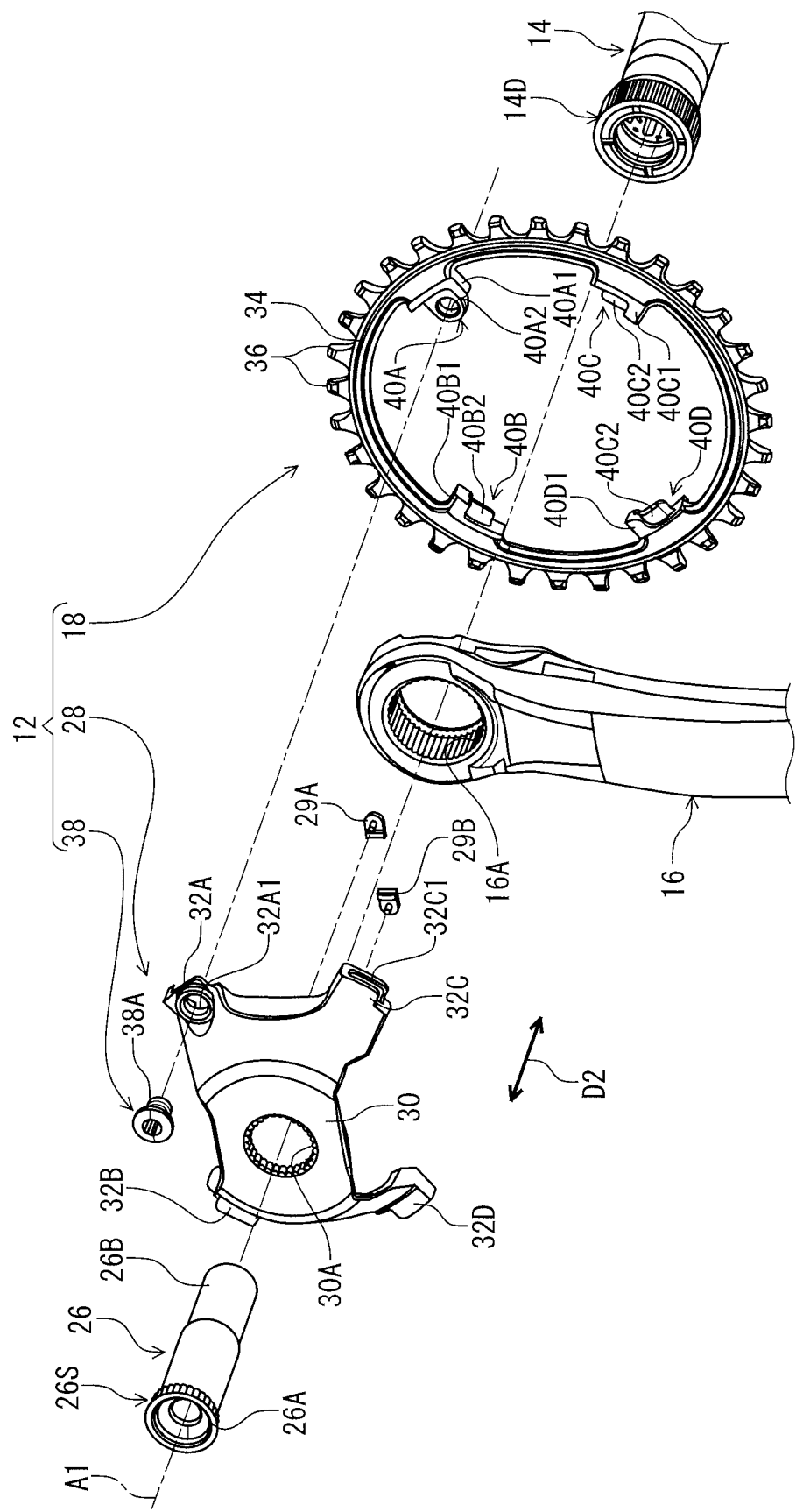
FIG. 5 is another partial exploded perspective view of the bicycle crank assembly illustrated in FIG. 1.

As seen in FIGS. 4 and 5, the second attachment arm 32B includes an attachment groove 32B1 extending in the circumferential direction D1. The third attachment arm 32C includes an attachment groove 32C1 extending in the circumferential direction D1. The fourth attachment arm 32D includes an attachment groove 32D1 extending in the circumferential direction D1. The second coupling part 40B includes a circumferential stopper 40B1 and a guide 40B2 extending circumferentially from the circumferential stopper 40B1. The third coupling part 40C includes a circumferential stopper 40C1 and a guide 40C2 extending circumferentially from the circumferential stopper 40C1. The fourth coupling part 40D includes a circumferential stopper 40D1 and a guide 40D2 extending circumferentially from the circumferential stopper 40D1.

Figure 6:
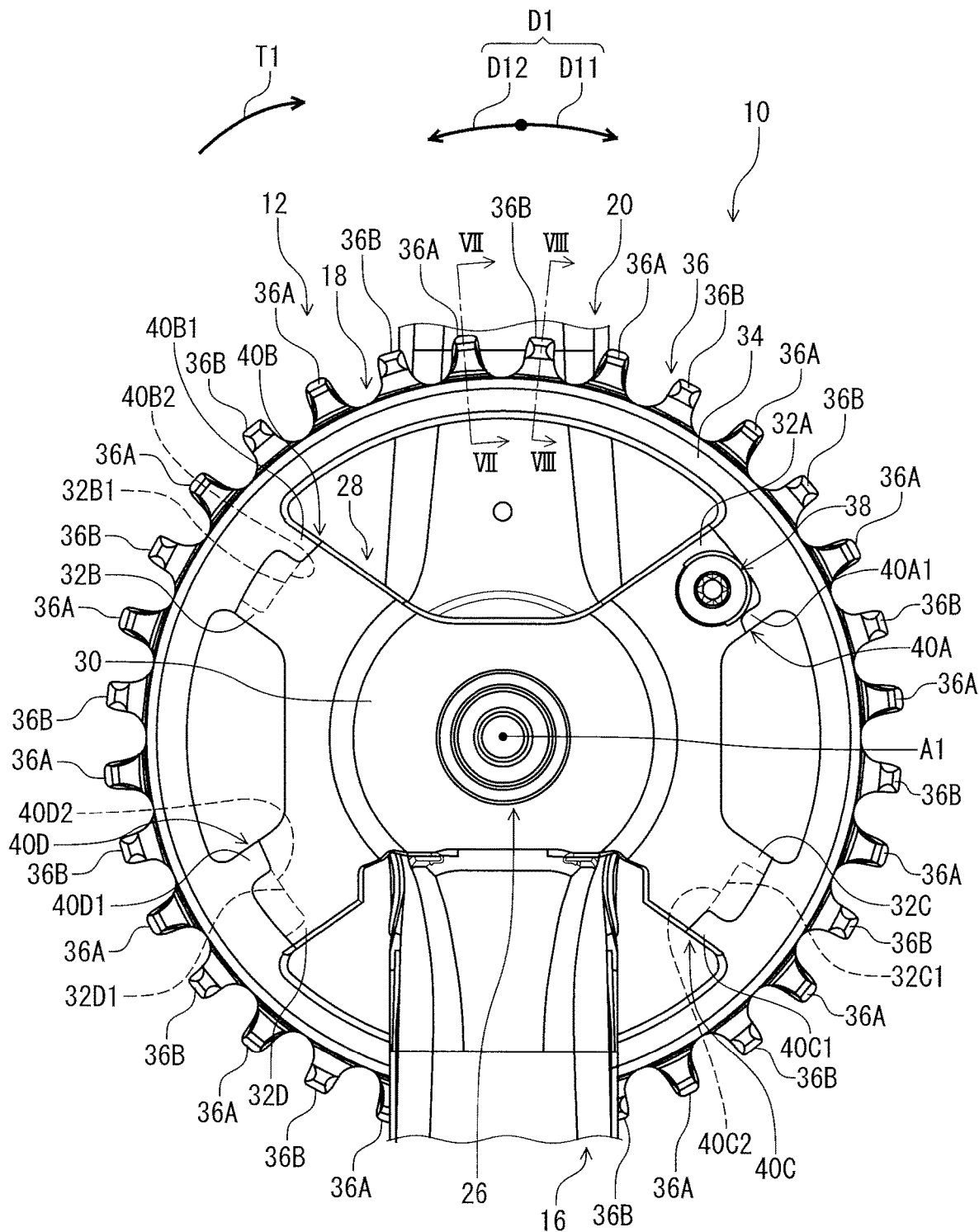
FIG. 6 is a side elevational view of the bicycle crank assembly illustrated in FIG. 1.

As seen in FIG. 6, the circumferential stopper 40A1 is in contact with the first attachment arm 32A in the circumferential direction D1. The circumferential stopper 40A1 is provided on a downstream side of the first attachment arm 32A in the driving rotational direction D11. The circumferential stopper 40B1 is in contact with the second attachment arm 32B in the circumferential direction D1. The circumferential stopper 40B1 is provided on a downstream side of the second attachment arm 32B in the driving rotational direction D11. The circumferential stopper 40C1 is in contact with the third attachment arm 32C in the circumferential direction D1. The circumferential stopper 40C1 is provided on a downstream side of the third attachment arm 32C in the driving rotational direction D11. The circumferential stopper 40D1 is in contact with the fourth attachment arm 32D in the circumferential direction D1. The circumferential stopper 40D1 is provided on a downstream side of the fourth attachment arm 32D in the driving rotational direction D11.

The guide 40B2 is provided in the attachment groove 32B1. The guide 40C2 is provided in the attachment groove 32C1. The guide 40D2 is provided in the attachment groove 32D1. The second coupling part 40B can be bonded to the second attachment arm 32B with a bonding material such as an adhesive agent. The third coupling part 40C can be bonded to the third attachment arm 32C with a bonding material such as an adhesive agent. The fourth coupling part 40D can be bonded to the fourth attachment arm 32D with a bonding material such as an adhesive agent.

The movable member 26 is a separate member from the attachment member 28. The movable member 26 is made of a first material. The attachment member 28 is made of a second material. The second material is different from the first material. Examples of the first material include a metallic material such as iron. Examples of the second material include a metallic material such as an aluminum alloy and a non-metallic material such as carbon. In this embodiment, the movable member 26 is a separate member from the sprocket unit 12. However, the movable member 26 can be at least partly provided integrally with the sprocket unit 12 as a one-piece unitary member.

As seen in FIG. 6, the plurality of sprocket teeth 36 includes a plurality of first teeth 36A and a plurality of second teeth 36B. The first teeth 36A and the second teeth 36B are alternately arranged in the circumferential direction D1.

Figure 7:
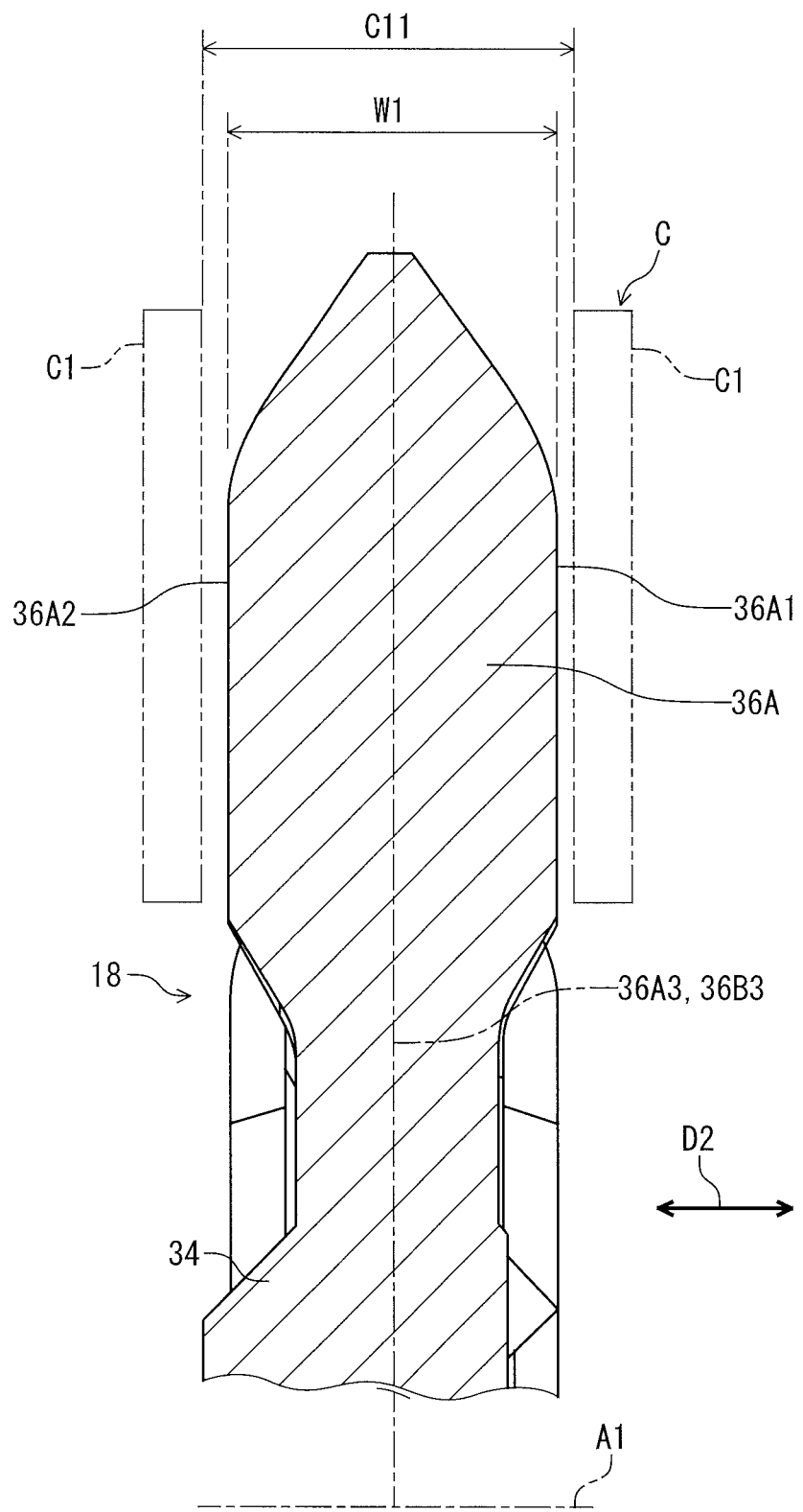
FIG. 7 is a cross-sectional view of a sprocket of the bicycle crank assembly taken along line VII-VII of FIG. 6.

As seen in FIG. 7, the first tooth 36A extends radially outwardly from the sprocket ring 34 to be received in only an outer link space C11 of the bicycle chain C. The outer link space C11 is provided between an opposed pair of outer link plates C1. The first tooth 36A has a first maximum axial width MW1 defined in the axial direction D2. The first tooth 36A includes a first axial surface 36A1 and a first axial reverse surface 36A2. The first axial surface 36A1 faces in the axial direction D2. The first axial reverse surface 36A2 faces in the axial direction D2 and is provided on a reverse side of the first axial surface 36A1. The first maximum axial width MW1 is defined between the first axial surface 36A1 and the first axial reverse surface 36A2 in the axial direction D2. The first tooth 36A has a first center plane 36A3 defined to bisect the first maximum axial width MW1 in the axial direction D2. The first center plane 36A3 is perpendicular to the rotational center axis A1.

Figure 8:
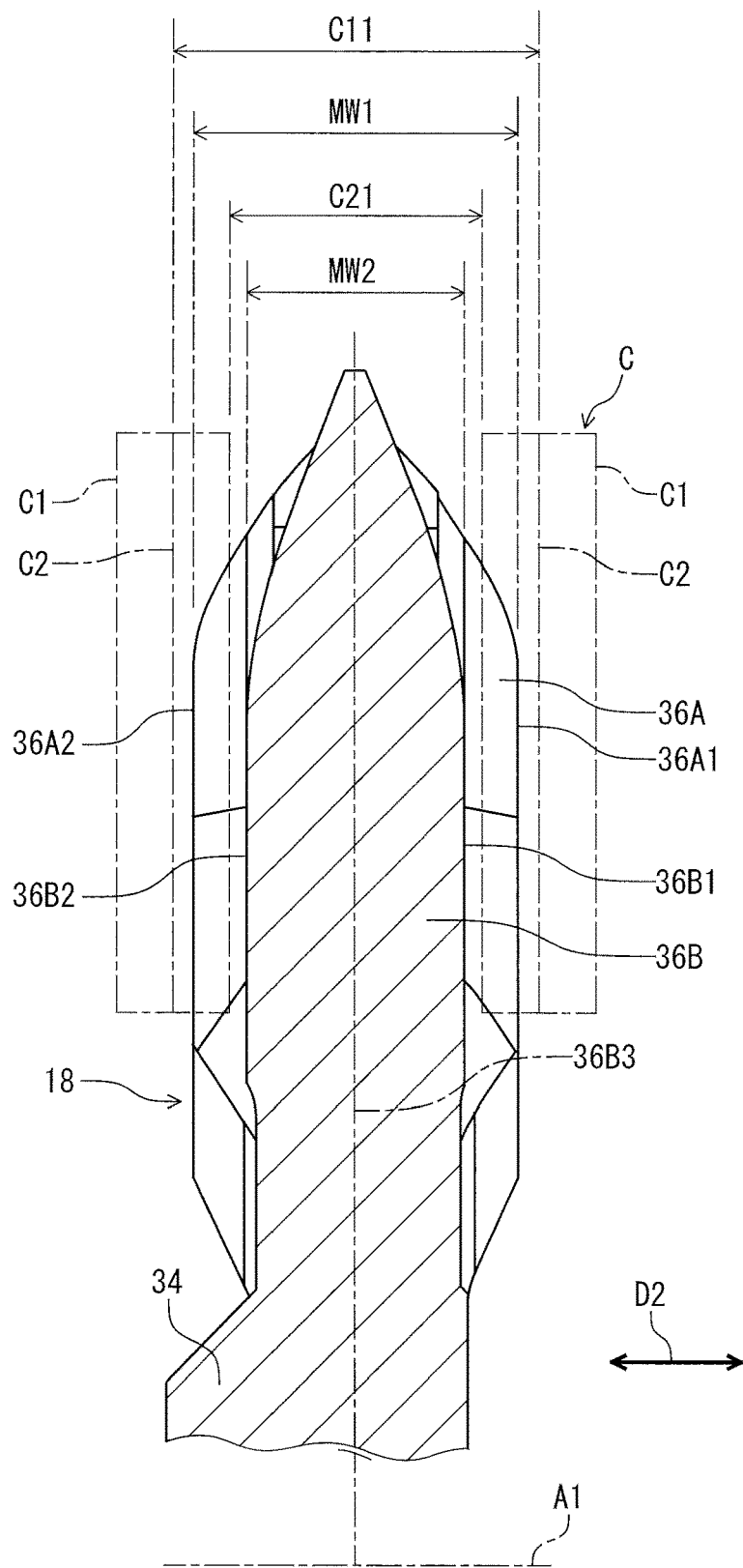
FIG. 8 is a cross-sectional view of the sprocket of the bicycle crank assembly taken along line VIII-VIII of FIG. 6.

As seen in FIG. 8, the second tooth 36B extends radially outwardly from the sprocket ring 34 to be received in only an inner link space C21 of the bicycle chain C. The inner link space C21 is provided between an opposed pair of inner link plates C2. The second tooth 36B has a second maximum axial width MW2 defined in the axial direction D2. The second tooth 36B includes a second axial surface 36B1 and a second axial reverse surface 36B2. The second axial surface 36B1 faces in the axial direction D2. The second axial reverse surface 36B2 faces in the axial direction D2 and is provided on a reverse side of the second axial surface 36B1. The second maximum axial width MW2 is defined between the second axial surface 36B1 and the second axial reverse surface 36B2 in the axial direction D2. The second tooth 36B has a second center plane 36B3 defined to bisect the second maximum axial width MW2 in the axial direction D2. The second center plane 36B3 is perpendicular to the rotational center axis A1. In this embodiment, the second center plane 36B3 is coincident with the first center plane 36A3 in the axial direction D2. However, the second center plane 36B3 can be offset from the first center plane 36A3 in the axial direction D2.

The first maximum axial width MW1 is larger than the second maximum axial width MW2. The first maximum axial width MW1 is smaller than an axial width of the outer link space C11 and is larger than an axial width of the inner link space C21. The second maximum axial width MW2 is smaller than the axial width of the inner link space C21. However, the first maximum axial width MW1 can be equal to or smaller than the second maximum axial width MW2.

As seen in FIGS. 4 and 5, the crank arm 16 includes a first internal spline 16A. The crank axle 14 includes a first external spline 14D provided at the first axle end 14A. The first external spline 14D meshes with the first internal spline 16A to rotate the crank axle 14 integrally with the crank arm 16.

Figure 9:
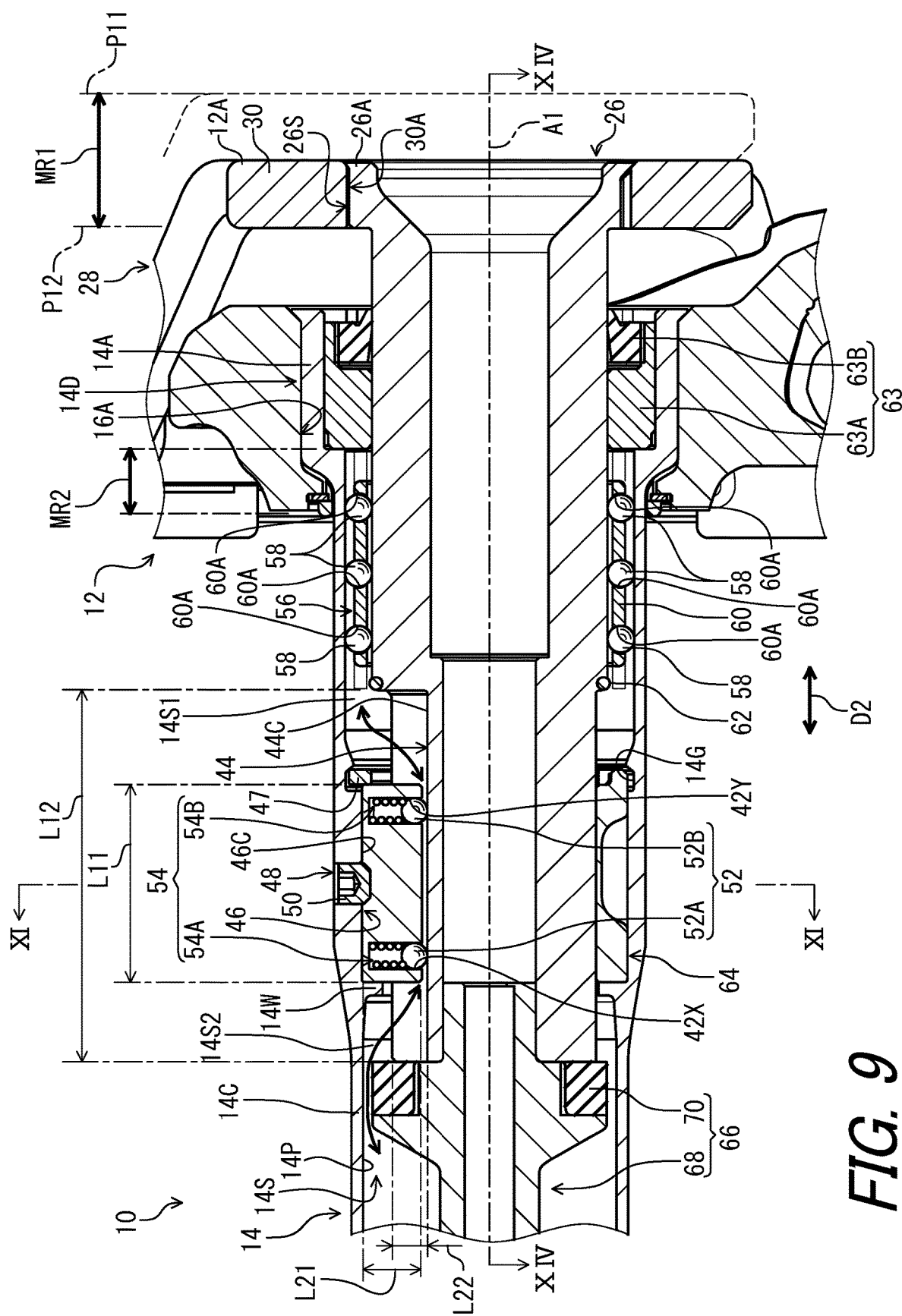
FIG. 9 is a partial enlarged cross-sectional view of the bicycle crank assembly illustrated in FIG. 3.

As seen in FIG. 9, the bicycle crank assembly 10 comprises a torque transmitting member 42 to transmit the pedaling torque T1 (FIG. 6) from the crank axle 14 to the sprocket 18. The torque transmitting member 42 is provided between the crank axle 14 and the movable member 26 to transmit the pedaling torque T1 (FIG. 6) between the crank axle 14 and the movable member 26.

The torque transmitting member 42 is coupled to one of the crank axle 14 and the movable member 26 to be stationary with respect to one of the crank axle 14 and the movable member 26 in the axial direction D2. The torque transmitting member 42 is coupled to the other of the crank axle 14 and the movable member 26 to be movable with respect to the other of the crank axle 14 and the movable member 26 in the axial direction D2.

In this embodiment, the torque transmitting member 42 is coupled to the crank axle 14 to be stationary with respect to the crank axle 14 in the axial direction D2. The torque transmitting member 42 is coupled to the movable member 26 to be movable relative to the movable member 26 in the axial direction D2. The torque transmitting member 42 is stationary with respect to the crank axle 14 and is movable with respect to the movable member 26 in the axial direction D2. However, the torque transmitting member 42 can be coupled to the movable member 26 to be stationary with respect to the movable member 26 in the axial direction D2. The torque transmitting member 42 can be coupled to the crank axle 14 to be movable relative to the crank axle 14 in the axial direction D2. The torque transmitting member 42 can be movable with respect to the crank axle 14 and stationary with respect to the movable member 26 in the axial direction D2.

Figure 10:
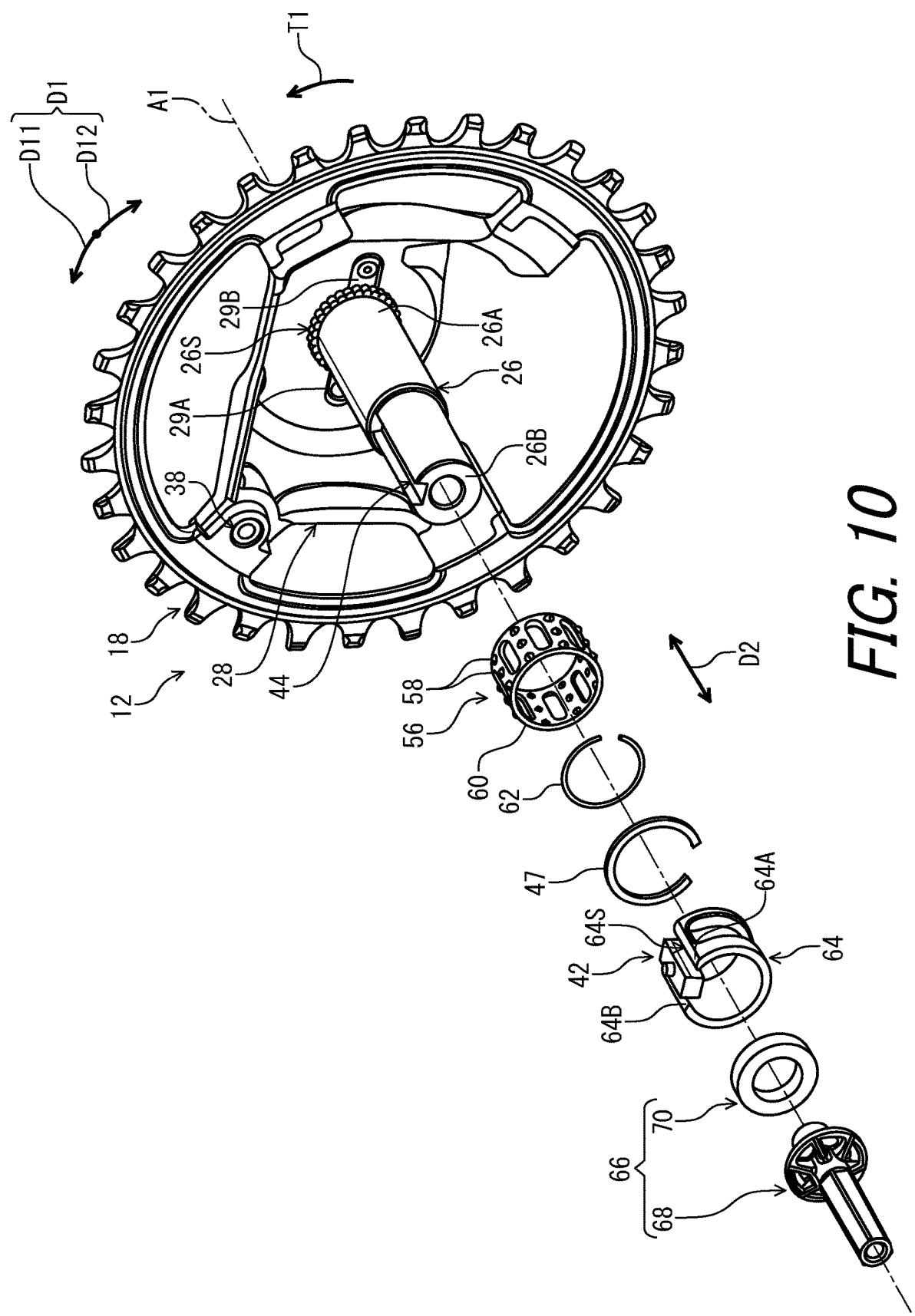
FIG. 10 is a partial exploded perspective view of the bicycle crank assembly illustrated in FIG. 1.

As seen in FIGS. 9 and 10, the movable member 26 includes a groove 44 extending in the axial direction D2. The torque transmitting member 42 is provided in the groove 44 so as to be slidable along the groove 44. The groove 44 is provided on an outer peripheral surface of the movable member 26. The groove 44 extends from the second end 26B toward the first end 26A in the axial direction D2.

As seen in FIG. 9, the torque transmitting member 42 has a first axial length L11. The groove 44 has a second axial length L12. The second axial length L12 is larger than the first axial length L11. The torque transmitting member 42 has a first radial length L21. The groove 44 has a second radial length L22. The first radial length L21 is larger than the second radial length L22. However, the second axial length L12 can be equal to or smaller than the first axial length L11. The first radial length L21 can be equal to or smaller than the second radial length L22.

Figure 11:
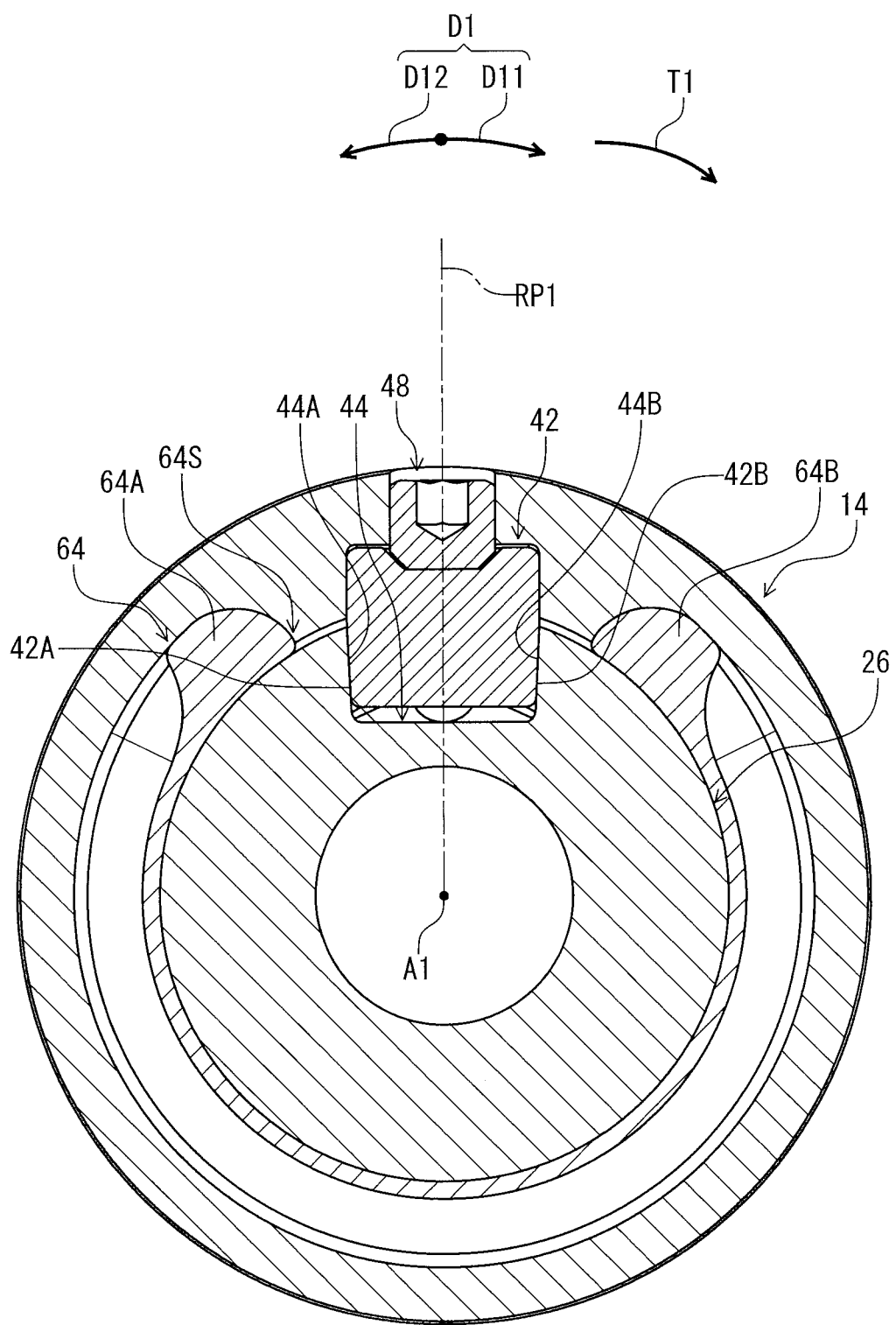
FIG. 11 is a cross-sectional view of the sprocket of the bicycle crank assembly taken along line XI-XI of FIG. 9.

As seen in FIG. 11, the torque transmitting member 42 includes a first surface 42A and a second surface 42B. The first surface 42A faces in the circumferential direction D1 of the rotational center axis A1. The second surface 42B faces in the circumferential direction D1. The second surface 42B is provided on a reverse side of the first surface 42A in the circumferential direction D1.

At least one of the first surface 42A and the second surface 42B is inclined relative to a reference plane RP1 parallel to the axial direction D2. The reference plane RP1 extends radially outwardly from the rotational center axis A1. In this embodiment, the first surface 42A and the second surface 42B are inclined relative to the reference plane RP1. However, at least one of the first surface 42A and the second surface 42B can be parallel to the reference plane RP1.

The movable member 26 includes a first receiving surface 44A and a second receiving surface 44B. The first receiving surface 44A faces in the circumferential direction D1. The first receiving surface 44A is contactable with the first surface 42A. The second receiving surface 44B faces the first receiving surface 44A in the circumferential direction D1. The second receiving surface 44B is contactable with the second surface 42B. The first receiving surface 44A and the second receiving surface 44B at least partly provide the groove 44. In this embodiment, the movable member 26 includes an additional surface 44C. The first receiving surface 44A, the second receiving surface 44B, and the additional surface 44C provide the groove 44.

At least one of the first receiving surface 44A and the second receiving surface 44B is inclined relative to the reference plane RP1. A circumferential distance CW2 is defined between the first receiving surface 44A and the second receiving surface 44B in the circumferential direction D1. The first receiving surface 44A and the second receiving surface 44B are inclined relative to each other to increase the circumferential distance CW2 from a radially inner side to a radially outer side of the groove 44. In this embodiment, the first receiving surface 44A and the second receiving surface 44B are inclined relative to the reference plane RP1. However, at least one of the first receiving surface 44A and the second receiving surface 44B can be parallel to the reference plane RP1.

Figure 12:
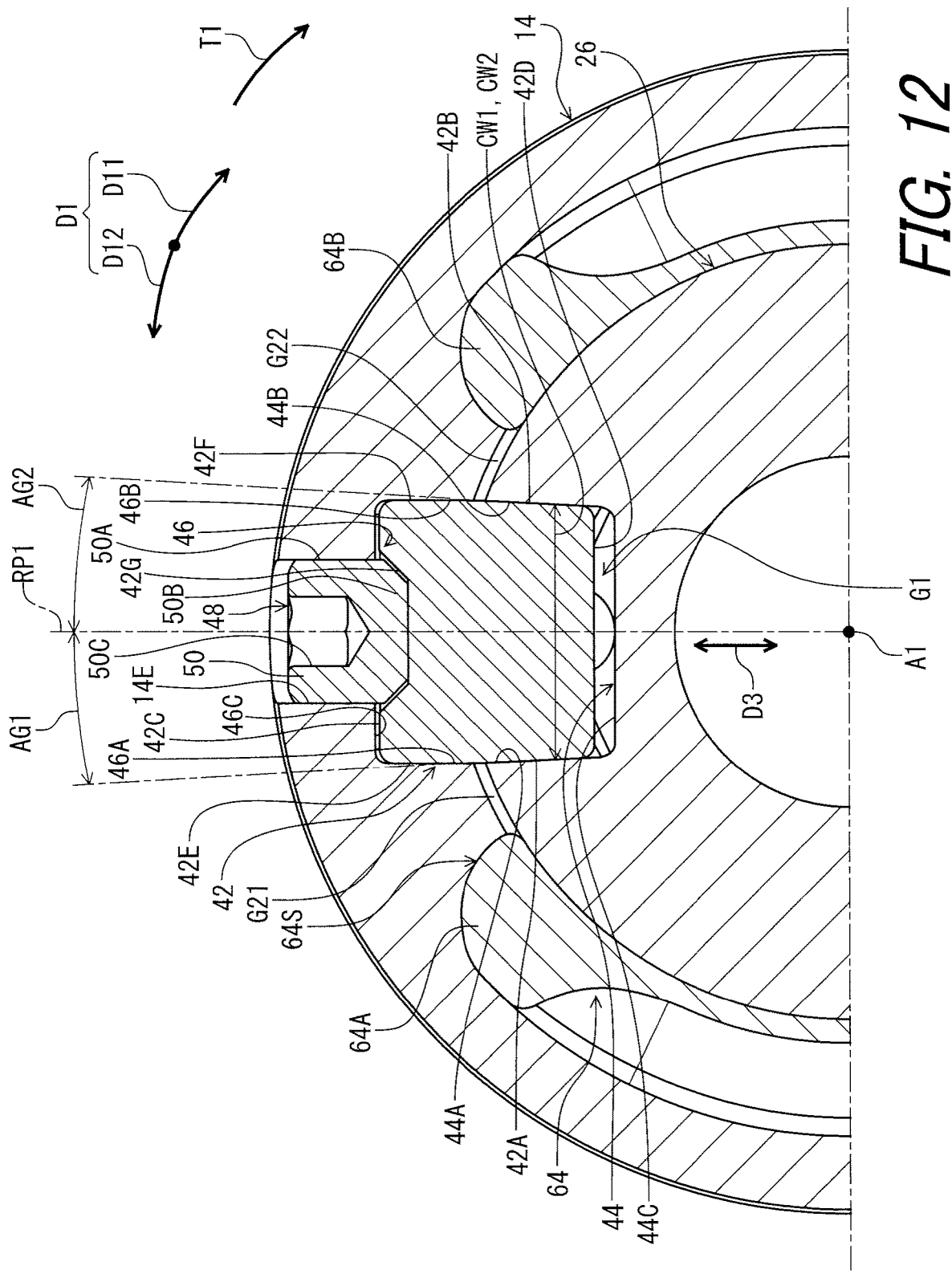
FIG. 12 is a partial enlarged cross-sectional view of the sprocket of the bicycle crank assembly illustrated in FIG. 11.

As seen in FIG. 12, the first surface 42A and the first receiving surface 44A are inclined relative to the reference plane RP1 by a first inclination angle AG1. The second surface 42B and the second receiving surface 44B are inclined relative to the reference plane RP1 by a second inclination angle AG2. The second inclination angle AG2 is substantially equal to the first inclination angle AG1. However, the second inclination angle AG2 can be different from the first inclination angle AG1. An inclination angle of the first surface 42A can be different from an inclination angle of the first receiving surface 44A. An inclination angle of the second surface 42B can be different from an inclination angle of the second receiving surface 44B. In this embodiment, each of the first inclination angle AG1 and the second inclination angle AG2 is approximately 3 degrees. However, the first inclination angle AG1 and the second inclination angle AG2 are not limited to this embodiment.

The torque transmitting member 42 includes a radially outer surface 42C and a radially inner surface 42D. The radially outer surface 42C faces radially outwardly. The radially inner surface 42D faces radially inwardly. The radially inner surface 42D is provided radially on a reverse side of the radially outer surface 42C. The first surface 42A and the second surface 42B are inclined relative to each other to increase a circumferential width CW1 of the torque transmitting member 42 from the radially inner surface 42D toward the radially outer surface 42C. However, the first surface 42A and the second surface 42B can be parallel to each other.

A gap G1 is provided between the torque transmitting member 42 and the movable member 26 in a radial direction D3 of the rotational center axis A1. The gap G1 is provided between the radially inner surface 42D and the additional surface 44C of the groove 44 in the radial direction D3. Thus, the torque transmitting member 42 is spaced apart from the additional surface 44C of the groove 44.

The torque transmitting member 42 includes a first additional surface 42E and a second additional surface 42F. The first additional surface 42E faces in the circumferential direction D1 of the rotational center axis A1. The second additional surface 42F faces in the circumferential direction D1. The second additional surface 42F is provided on a reverse side of the first additional surface 42E in the circumferential direction D1.

The first additional surface 42E is provided between the first surface 42A and the radially outer surface 42C. The second additional surface 42F is provided between the second surface 42B and the radially outer surface 42C. The first additional surface 42E and the second additional surface 42F are parallel to the reference plane RP1. The first surface 42A is inclined relative to the first additional surface 42E. The second surface 42B is inclined relative to the second additional surface 42F. However, at least one of the first additional surface 42E and the second additional surface 42F can be inclined relative to the reference plane RP1.

The crank axle 14 includes a support groove 46. The torque transmitting member 42 is provided in the support groove 46. The support groove 46 includes a first support surface 46A, a second support surface 46B, and a third support surface 46C. The first support surface 46A faces in the circumferential direction D1. The first support surface 46A is in contact with the first additional surface 42E. The second support surface 46B faces in the circumferential direction D1. The second support surface 46B is in contact with the second additional surface 42F. The third support surface 46C faces radially outwardly. The third support surface 46C faces the radially outer surface 42C of the torque transmitting member 42. The first support surface 46A and the second support surface 46B are parallel to the reference plane RP1. However, at least one of the first support surface 46A and the second support surface 46B can be inclined relative to the reference plane RP1. The first support surface 46A, the second support surface 46B, and the third support surface 46C provides the support groove 46. The torque transmitting member 42 is held in the support groove 46.

As seen in FIG. 9, the crank axle 14 includes an inner peripheral surface 14P, an inner wall 14W, and an inner groove 14G. The inner peripheral surface 14P at least partly defines the internal space 14S. The inner wall 14W extends radially inwardly from the intermediate part 14C. The inner wall 14W has an annular shape extending along the inner peripheral surface 14P about the rotational center axis A1. The inner wall 14W is provided at an end of the support groove 46. The inner wall 14W is contactable with the torque transmitting member 42 to restrict an axial movement of the torque transmitting member 42 relative to the crank axle 14 in the axial direction D2. The inner groove 14G is provided on the inner peripheral surface 14P and extends along the inner peripheral surface 14P about the rotational center axis A1. The support groove 46 is provided between the inner wall 14W and the inner groove 14G in the axial direction D2.

As seen in FIGS. 9 and 10, the bicycle crank assembly 10 comprises a retaining ring 47. As seen in FIG. 9, the retaining ring 47 is attached to the crank axle 14. The retaining ring 47 is fitted in the inner groove 14G of the crank axle 14. The torque transmitting member 42 is provided between the inner wall 14W and the retaining ring 47 in the axial direction D2. The inner wall 14W and the retaining ring 47 restrict the axial movement of the torque transmitting member 42 relative to the crank axle 14 in the axial direction D2. Thus, the torque transmitting member 42 is stationary relative to the crank axle 14 in the axial direction D2 when the movable member 26 is moved relative to the crank axle 14 in the axial direction D2.

As seen in FIG. 12, the bicycle crank assembly 10 further comprises an adjustment structure 48. The adjustment structure 48 is configured to change a radial position of the torque transmitting member 42 relative to the groove 44. The adjustment structure 48 is accessible from an outside of the crank axle 14.

In this embodiment, the adjustment structure 48 includes an adjustment screw 50. The adjustment screw 50 includes an externally threaded part 50A and a contact end 50B. The crank axle 14 includes an adjustment threaded hole 14E that is open to outside of the crank axle. The adjustment screw 50 is threadedly engaged in the adjustment threaded hole 14E. The contact end 50B is engaged with the torque transmitting member 42. The torque transmitting member 42 includes a receiving recess 42G. The contact end 50B is provided in the receiving recess 42G. The adjustment screw 50 includes a tool engagement part 50C such as a hexagonal hole. The tool engagement part 50C is accessible from the outside of the crank axle 14.

Rotation of the adjustment structure 48 moves the adjustment structure 48 radially relative to the crank axle 14. The torque transmitting member 42 is fitted into the groove 44 of the movable member 26 when the adjustment structure 48 is moved toward the groove 44.

As seen in FIG. 9, the bicycle crank assembly 10 further comprises a sliding structure 52 provided between the torque transmitting member 42 and the groove 44. In this embodiment, the sliding structure 52 includes a first rolling element 52A and a second rolling element 52B. The first rolling element 52A and the second rolling element 52B are in contact with the additional surface 44C of the groove 44. The torque transmitting member 42 includes a first hole 42X and a second hole 42Y The first rolling element 52A is rotatably provided in the first hole 42X. The second rolling element 52B is rotatably provided in the second hole 42Y. However, the sliding structure 52 can include another member instead of or in addition to the first and second rolling elements 52A and 52B.

The bicycle crank assembly 10 further comprises a biasing member 54 to bias the sliding structure 52 toward the groove 44. The biasing member 54 is disposed in the torque transmitting member 42. In this embodiment, the biasing member 54 includes a first spring 54A and a second spring 54B. The first spring 54A is provided in the first hole 42X to bias the first rolling element 52A against the additional surface 44C of the groove 44. The second spring 54B is provided in the second hole to bias the second rolling element 52B against the additional surface 44C of the groove 44. However, the biasing member 54 can include another element instead of or in addition to the first and second springs 54A and 54B. The biasing member 54 can be provided at a position other than the inside of the torque transmitting member 42.

As seen in FIGS. 9 and 10, the bicycle crank assembly 10 comprises a bearing structure 56. The bearing structure 56 is radially disposed between the movable member 26 and the crank axle 14 about the rotational center axis A1. The bearing structure 56 is disposed between the movable member 26 and the crank axle 14 to slidably support the movable member 26 in the axial direction D2. The bearing structure 56 is disposed at a location different from a location of the torque transmitting member 42 in the axial direction D2. In the illustrated embodiment, the bearing structure 56 is disposed to be spaced apart from the torque transmitting member 42 in the axial direction D2. However, the bearing structure 56 can be disposed to partly overlap with the torque transmitting member 42 in the axial direction D2.

As seen in FIG. 9, the bearing structure 56 includes a plurality of bearings 58 and a retainer 60. The plurality of bearings 58 is rotatably provided between the crank axle 14 and the movable member 26 in the radial direction about the rotational center axis A1. The plurality of bearings 58 contacts the crank axle 14 and the movable member 26. The retainer 60 is provided between the crank axle 14 and the movable member 26 to retain the plurality of bearings 58 in the radial direction about the rotational center axis A1. The retainer 60 has a tubular shape. The retainer 60 rotatably retains the plurality of bearings 58 relative to the crank axle 14 and the movable member 26. The retainer 60 includes a plurality of retaining holes 60A. The bearings 58 are rotatably provided in the retaining holes 60A.

The movable member 26 is movable relative to the crank axle 14 in a movable range MR1 in the axial direction D2. The bearing structure 56 is movable relative to the crank axle 14 in a bearing movable range MR2 in the axial direction D2. In this embodiment, the bearing movable range MR2 is smaller than the movable range MR1 of the movable member 26. The bearing movable range MR2 is equal to or larger than 50% of the movable range MR1 of the movable member 26. However, the bearing movable range MR2 can be equal to or larger than the movable range MR1. The bearing movable range MR2 can be smaller than 50% of the movable range MR1.

As seen in FIGS. 9 and 10, the bicycle crank assembly 10 comprises a bearing retaining ring 62. The bearing retaining ring 62 is attached to the movable member 26 to restrict an axial movement of the bearing structure 56 toward the groove 44 in the axial direction D2.

As seen in FIG. 9, the bicycle crank assembly 10 comprises an additional bearing structure 63. The additional bearing structure 63 is secured to the first axle end 14A of the crank axle 14 to movably support the movable member 26 relative to the crank axle 14 in the axial direction D2. The additional bearing structure 63 includes a sliding bush 63A and a seal ring 63B. The sliding bush 63A is secured to the first axle end 14A of the crank axle 14 to movably support the movable member 26 relative to the crank axle 14 in the axial direction D2. The seal ring 63B is attached to the sliding bush 63A. The additional bearing structure 63 can be omitted from the bicycle crank assembly 10.

Figure 13:
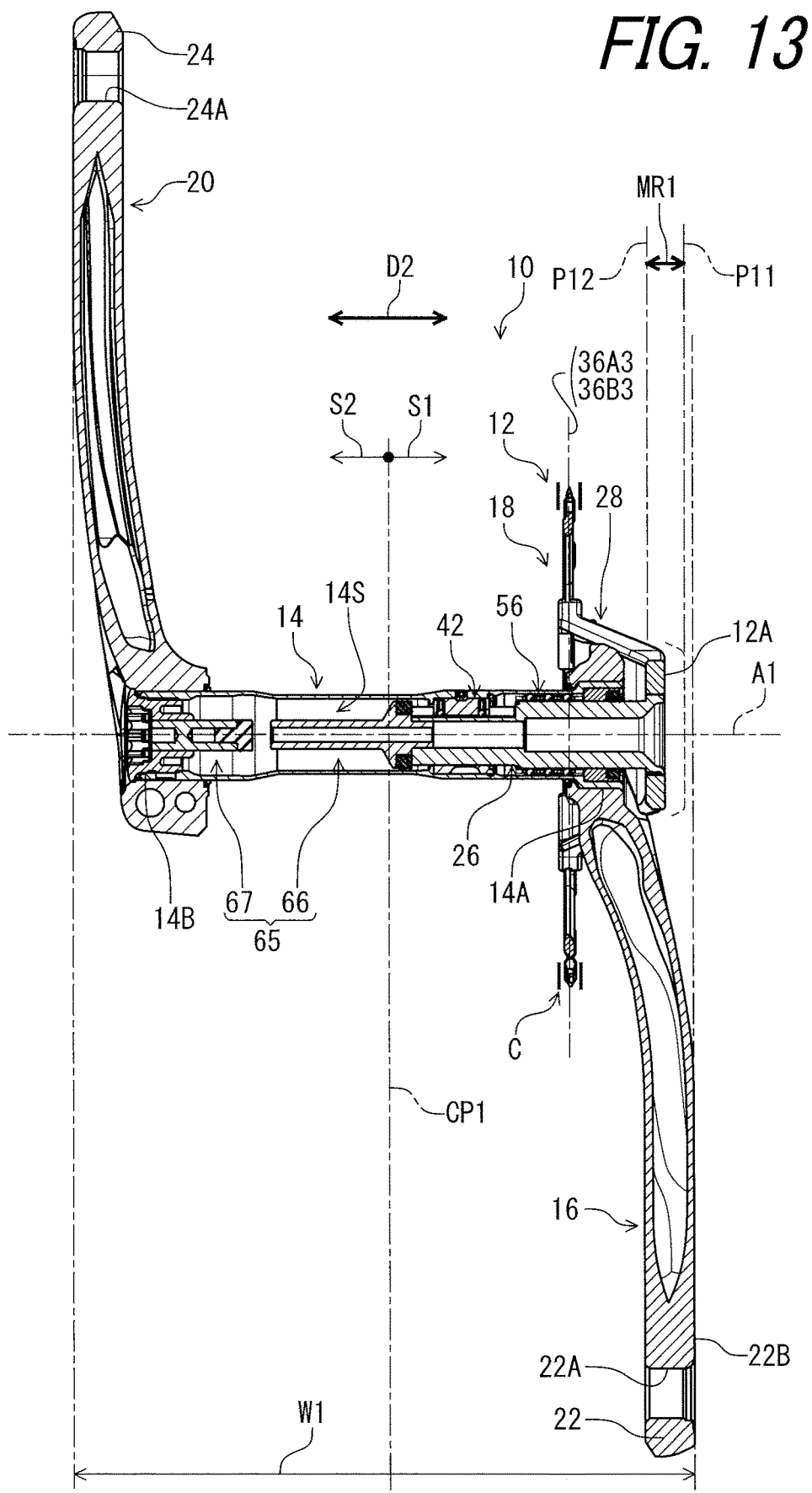
FIG. 13 is a cross-sectional view of the sprocket of the bicycle crank assembly taken along line XIII-XIII of FIG. 1.

In this embodiment, as seen in FIG. 13, the bearing structure 56 is provided between the first axle end 14A and the torque transmitting member 42 in the axial direction D2. The bearing structure 56 is provided between the crank arm 16 and the torque transmitting member 42 in the axial direction D2. The bicycle crank assembly 10 has an axial center plane CP1 perpendicular to the rotational center axis A1. The axial center plane CP1 bisects an axial maximum width W1 of the bicycle crank assembly 10. The bearing structure 56 is provided on a right side with respect to the axial center plane CP1. However, the bearing structure 56 can be provided on a left side with respect to the axial center plane CP1. The bearing structure 56 can be provided between the second axle end 14B and the torque transmitting member 42. The bearing structure 56 can be provided between the additional crank arm 20 and the torque transmitting member 42 in the axial direction D2. The bearing structure 56 and the torque transmitting member 42 are provided on a first side S1 relative to the axial center plane CP1. The first axle end 14A of the crank axle 14 is provided on the first side S1 relative to the axial center plane CP1. The second axial end 14B of the crank axle 14 is provided on a second side S2 relative to the axial center plane CP1. The second side S2 is defined on an opposite side of the first side S1 relative to the axial center plane CP1 in the axial direction D2. However, the bearing structure 56 can be provided on one of the first side S1 and the second side S2, and the torque transmitting member 42 can be provided on the other of the first side S1 and the second side S2.

As seen in FIGS. 10 and 11, the bicycle crank assembly 10 further comprises a bushing member 64. The bushing member 64 is arranged circumferentially with the torque transmitting member 42. The bushing member 64 includes a slit 64S extending in the axial direction D2. The torque transmitting member 42 is provided in the slit 64S. The bushing member 64 is provided between the crank axle 14 and the movable member 26. The bushing member 64 is attached to the crank axle 14 and is slidable with the movable member 26.

In this embodiment, the bushing member 64 includes a first circumferential end 64A and a second circumferential end 64B. The bushing member 64 extends circumferentially between the first circumferential end 64A and the second circumferential end 64B. The slit 64S is provided between the first circumferential end 64A and the second circumferential end 64B. The torque transmitting member 42 is provided between the first circumferential end 64A and the second circumferential end 64B. However, the bushing member 64 can be omitted from the bicycle crank assembly 10. The bushing member 64 can have an annular shape in a case where the bushing member 64 is offset from the torque transmitting member 42 in the axial direction D2. In this embodiment, the bushing member 64 is provided integrally as a one-piece unitary member. However, the bushing member 64 can include a plurality of separate members.

As seen in FIG. 12, a first additional gap G21 and a second additional gap G22 are provided radially between the crank axle 14 and the movable member 26. The first additional gap G21 is provided between the torque transmitting member 42 and the first circumferential end 64A in the circumferential direction D1. The second additional gap G22 is provided between the torque transmitting member 42 and the second circumferential end 64B in the circumferential direction D1.

Figure 14:
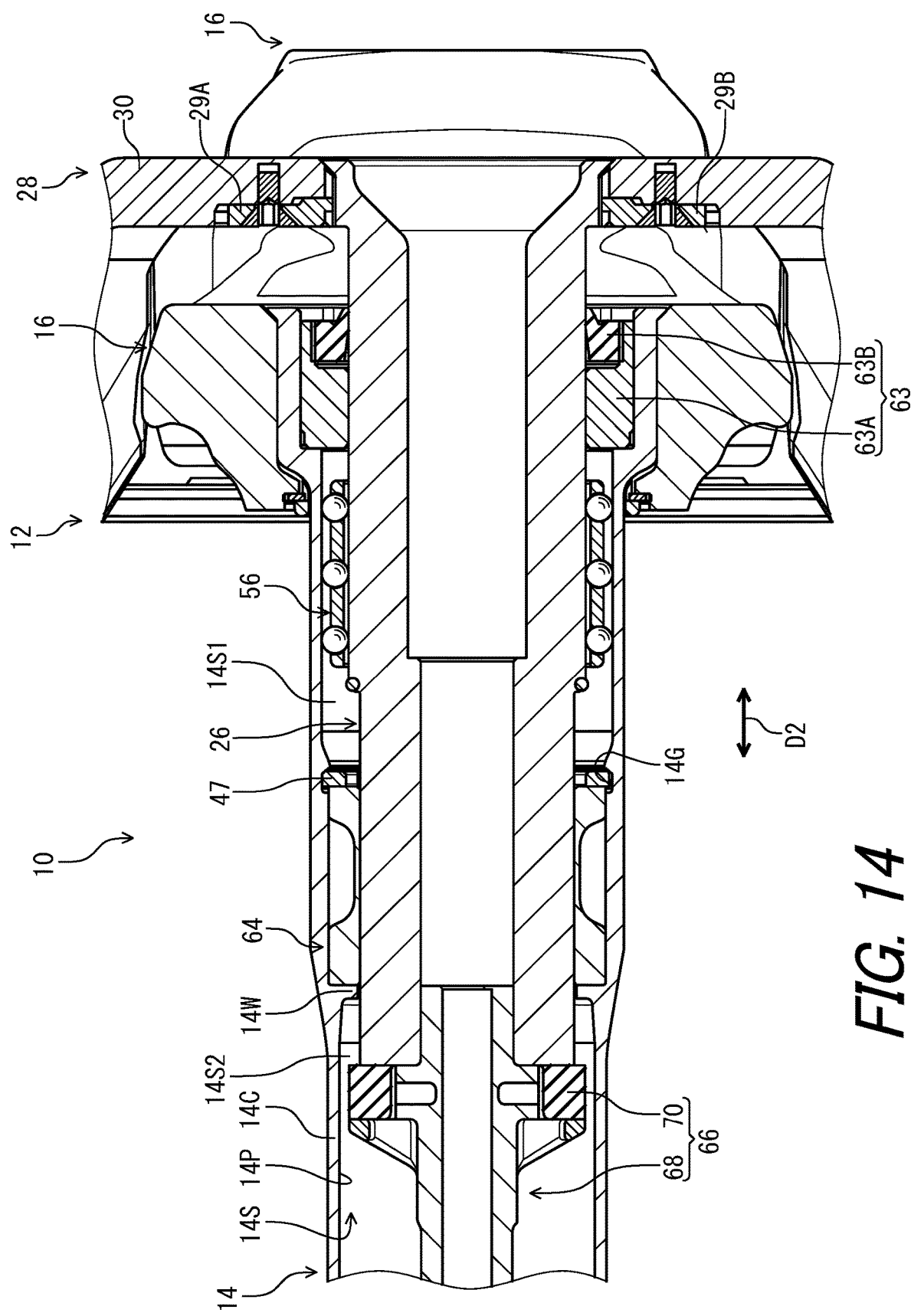
FIG. 14 is a cross-sectional view of the sprocket of the bicycle crank assembly taken along line XIV-XIV of FIG. 9.

As seen in FIG. 14, the bushing member 64 is provided between the inner wall 14W and the retaining ring 47 in the axial direction D2. The inner wall 14W and the retaining ring 47 restrict the axial movement of the bushing member 64 relative to the crank axle 14 in the axial direction D2. Thus, the bushing member 64 is stationary relative to the crank axle 14 in the axial direction D2 when the movable member 26 is moved relative to the crank axle 14 in the axial direction D2.

The bushing member 64 divides the internal space 14S into a first space 14S1 and a second space 14S2 in the axial direction D2. A volume of each of the first space 14S1 and the second space 14S2 varies in response to the axial movement of the movable member 26 relative to the crank axle 14. As seen in FIG. 9, air flows between the first space 14S1 and the second space 14S2 through at least one of the gap G1, the first additional gap G21 (FIG. 12), and the second additional gap G22 (FIG. 12) when the movable member 26 moves relative to the crank axle 14 in the axial direction D2.

As seen in FIG. 13, the sprocket unit 12 has a reference surface 12A perpendicular to the rotational center axis A1. The pedal attachment end 22 has an axially outermost surface 22B. The attachment member 28 includes the reference surface 12A. In this embodiment, the reference surface 12A is an axially outermost surface of the sprocket unit 12. The reference surface 12A is the farthest from the axial center plane CP1 of the bicycle crank assembly 10 in the axial direction D2.

The movable member 26 is movably provided with respect to the crank axle 14 to move the sprocket unit 12 from an axially outward position P11 to an axially inward position P12 in the axial direction D2 of the rotational center axis A1. The reference surface 12A is positioned at an axial position equal to an axial position of the axially outermost surface 22B in a state where the sprocket unit 12 is at the axially outward position P11 or is positioned axially inwardly from the axially outermost surface 22B in the axial direction D2 in the state where the sprocket unit 12 is at the axially outward position P11.

In this embodiment, the reference surface 12A is positioned axially inwardly from the axially outermost surface 22B in the axial direction D2 in the state where the sprocket unit 12 is at the axially outward position P11. However, the reference surface 12A can be configured to be positioned at an axial position equal to an axial position of the axially outermost surface 22B in the state where the sprocket unit 12 is at the axially outward position P11.

The reference surface 12A is movable relative to the crank arm 16 from the axially inward position P12 to the axially outward position P11 without passing axially outwardly beyond the reference surface 12A. The movable range MR1 of the movable member 26 is defined between the axially outward position P11 and the axially inward position P12 as a maximum movable range of the sprocket unit 12. Thus, the axially outward position P11 can also be referred to as an axially outermost position P11. The axially inward position P12 can also be referred to as an axially innermost position P12.

As seen in FIG. 13, the bicycle crank assembly 10 comprises a stopper structure 65. The stopper structure 65 is provided in the internal space 14S of the crank axle 14 to restrict an axial movement of the movable member 26 relative to the crank axle 14 between the axially outward position Pll and the axially inward position P12.

The stopper structure 65 includes a first stopper 66 and a second stopper 67. The first stopper 66 is coupled to the movable member 26 to move relative to the crank axle 14 along with the movable member 26 in the axial direction D2. The second stopper 67 is coupled to the crank axle 14.

As seen in FIG. 10, the first stopper 66 includes a first stopper body 68 and a first receiving member 70. The first stopper body 68 is secured to the movable member 26. The first stopper body 68 is secured to the second end 26B of the movable member 26. As seen in FIG. 3, the first stopper body 68 extends from the second end 26B of the movable member 26 toward the second axle end 14B.

As seen in FIG. 9, the first receiving member 70 is attached to the movable member 26. The first receiving member 70 is held between the first stopper body 68 and the second end 26B of the movable member 26. The first receiving member 70 is made of an elastic member such as rubber. The first receiving member 70 is contactable with the inner wall 14W. The sprocket unit 12 is positioned at the axially outward position P11 in a state where the first receiving member 70 is in contact with the inner wall 14W.

Figure 15:
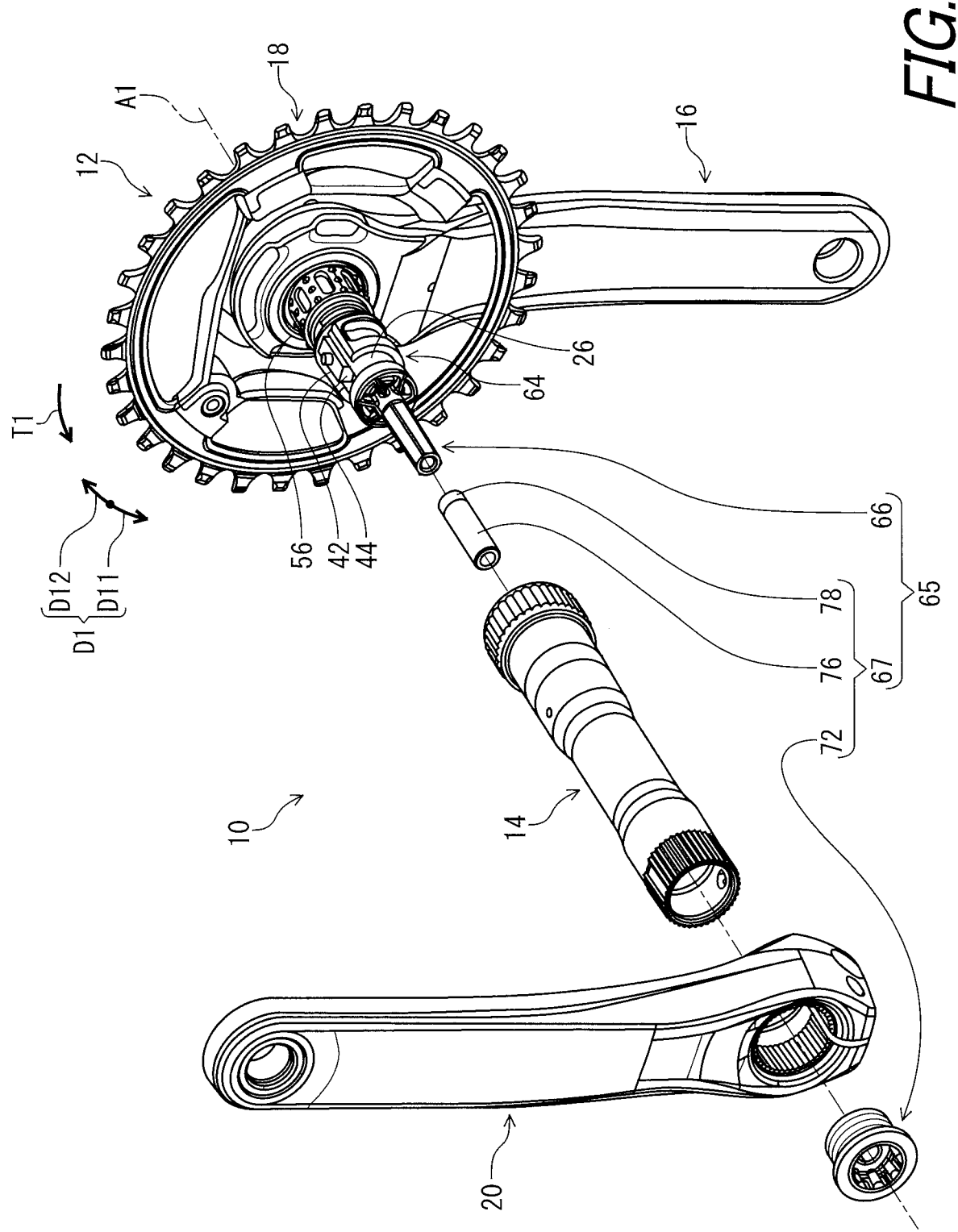
FIG. 15 is a partial exploded perspective view of the bicycle crank assembly illustrated in FIG. 1.

As seen in FIGS. 3 and 15, the second stopper 67 includes a cap 72, a rod 76, a second elastic member 78. The cap 72 is secured to the second axle end 14B of the crank axle 14 to cover the second end opening 14B1 of the second axle end 14B. The rod 76 is secured to the cap 72 and extends from the cap 72 toward the movable member 26 in the axial direction D2. The second elastic member 78 is attached to an end of the rod 76. The second elastic member 78 is contactable with the first stopper 66. In this embodiment, the second elastic member 78 is contactable with the first stopper body 68. As seen in FIG. 3, the sprocket unit 12 is positioned at the axially inward position P12 in a state where the second elastic member 78 is in contact with the first stopper body 68 of the first stopper 66.

Figure 16:
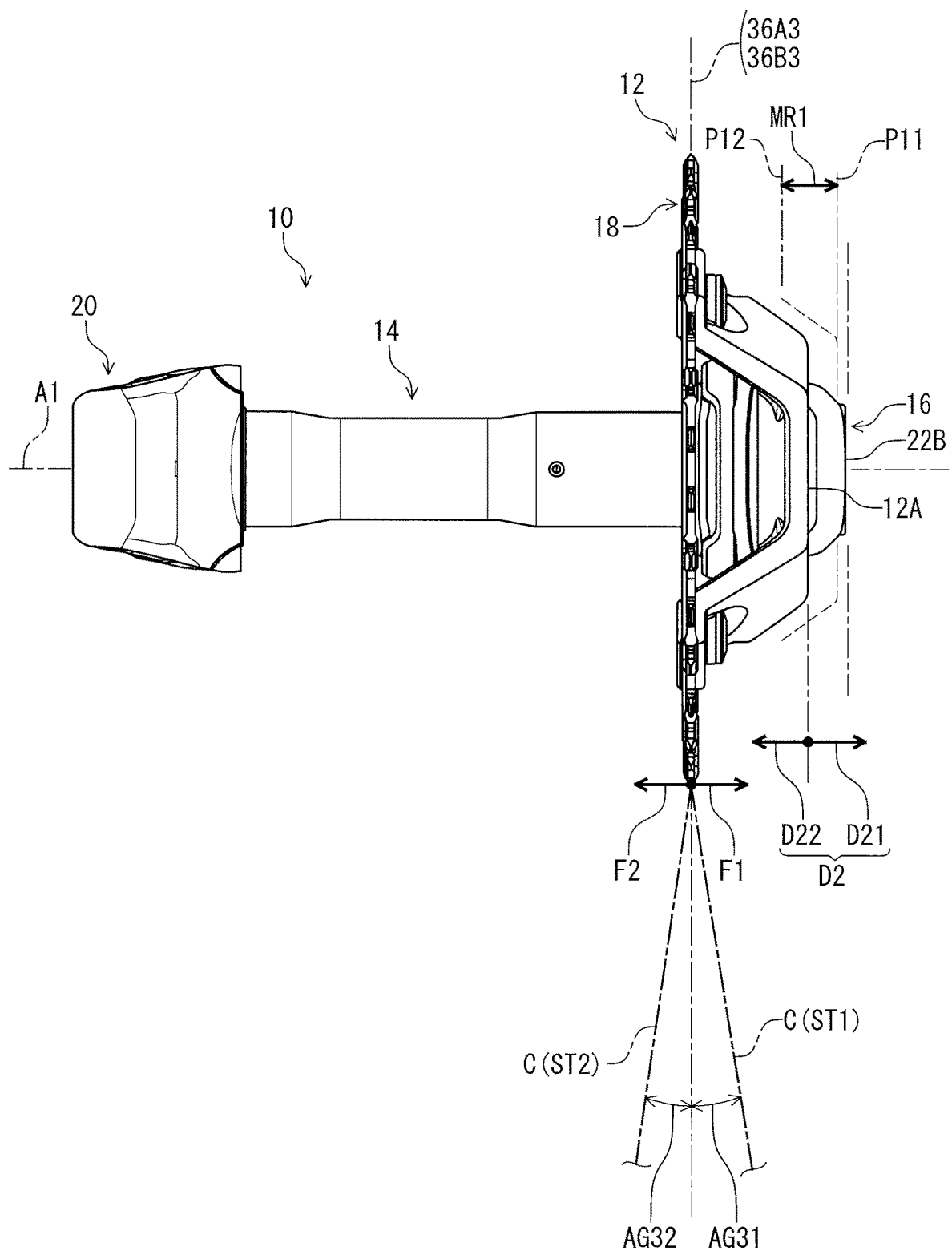
FIG. 16 is a top view of the bicycle crank assembly illustrated in FIG. 1.

As seen in FIG. 16, the sprocket unit 12 (the sprocket 18) receives a first axial force F1 in a first axial direction D21 when the bicycle chain C is in a first inclination state ST1 where the bicycle chain C is inclined relative to the first and second center planes 36A3 and 36B3 in the first axial direction D21. Thus, the sprocket unit 12 (the sprocket 18) moves relative to the crank axle 14 in the first axial direction D21 because of the first axial force F1 when the bicycle chain C is in the first inclination state ST1. This reduces an inclination angle AG31 of the bicycle chain C. For example, the first inclination state ST1 occurs when the bicycle chain C is engaged with the sprocket 18 and a smallest rear sprocket (not shown). The first axial direction D21 extends along the axial direction D2.

The sprocket unit 12 (the sprocket 18) receives a second axial force F2 in a second axial direction D22 when the bicycle chain C is in a second inclination state ST2 where the bicycle chain C is inclined relative to the first and second center planes 36A3 and 36B3 in the second axial direction D22. Thus, the sprocket unit 12 (the sprocket 18) moves relative to the crank axle 14 in the second axial direction D22 because of the second axial force F2 when the bicycle chain C is in the second inclination state ST2. This reduces an inclination angle AG32 of the bicycle chain C. For example, the second inclination state ST2 occurs when the bicycle chain C is engaged with the sprocket 18 and a largest rear sprocket (not shown). The second axial direction D22 extends along the axial direction D2 and is opposite to the first axial direction D21.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle crank assembly comprising:
   a sprocket having a rotational center axis;
   a crank axle extending along the rotational center axis, the crank axle including an internal space;
   a movable member movably provided in the internal space to move the sprocket in an axial direction of the rotational center axis;
   a torque transmitting member to transmit a pedaling torque from the crank axle to the sprocket; and
   a bearing structure disposed between the movable member and the crank axle to slidably support the movable member in the axial direction, the bearing structure being disposed at a location different from a location of the torque transmitting member in the axial direction.

2. The bicycle crank assembly according to claim 1, wherein
   the torque transmitting member is stationary with respect to the crank axle and is movable with respect to the movable member in the axial direction.

3. The bicycle crank assembly according to claim 2, wherein
   the movable member includes a groove extending in the axial direction, and
   the torque transmitting member is provided in the groove so as to be slidable along the groove.

4. The bicycle crank assembly according to claim 3, wherein
   the torque transmitting member includes
      a first surface facing in a circumferential direction of the rotational center axis, and
      a second surface facing in the circumferential direction, the second surface being provided on a reverse side of the first surface in the circumferential direction.

5. The bicycle crank assembly according to claim 4, wherein
   the movable member includes
      a first receiving surface facing in the circumferential direction, the first receiving surface being contactable with the first surface, and
      a second receiving surface facing the first receiving surface in the circumferential direction, the second receiving surface being contactable with the second surface, and
   the first receiving surface and the second receiving surface at least partly provide the groove.

6. The bicycle crank assembly according to claim 4, wherein
   at least one of the first surface and the second surface is inclined relative to a reference plane parallel to the axial direction, the reference plane extending radially outwardly from the rotational center axis.

7. The bicycle crank assembly according to claim 4, wherein
   the torque transmitting member includes
      a radially outer surface facing radially outwardly, and
      a radially inner surface facing radially inwardly, the radially inner surface being provided radially on a reverse side of the radially outer surface, and
   the first surface and the second surface are inclined relative to each other to increase a circumferential width of the torque transmitting member from the radially inner surface to the radially outer surface.

8. The bicycle crank assembly according to claim 3, further comprising
   an adjustment structure configured to change a radial position of the torque transmitting member relative to the groove.

9. The bicycle crank assembly according to claim 8, wherein
   the adjustment structure is accessible from an outside of the crank axle.

10. The bicycle crank assembly according to claim 3, further comprising
    a sliding structure provided between the torque transmitting member and the groove.

11. The bicycle crank assembly according to claim 10, further comprising
    a biasing member to bias the sliding structure toward the groove.

12. The bicycle crank assembly according to claim 11, wherein
    the biasing member is disposed in the torque transmitting member.

13. The bicycle crank assembly according to claim 3, wherein
    a gap is provided between the torque transmitting member and the movable member in a radial direction of the rotational center axis.

14. The bicycle crank assembly according to claim 1, wherein
    the crank axle includes a first axle end and a second axle end, the crank axle extending between the first axle end and the second axle end along the rotational center axis, and
    the bearing structure is provided between the first axle end and the torque transmitting member.

15. The bicycle crank assembly according to claim 1, wherein
    the movable member is movable relative to the crank axle in a movable range in the axial direction, the bearing structure is movable relative to the crank axle in a bearing movable range in the axial direction, and
    the bearing movable range is smaller than the movable range of the movable member.

16. The bicycle crank assembly according to claim 15, wherein
    the bearing movable range is equal to or larger than 50% of the movable range of the movable member.

17. The bicycle crank assembly according to claim 1, further comprising
    a bushing member arranged circumferentially with the torque transmitting member.

18. The bicycle crank assembly according to claim 17, wherein
the bushing member includes a slit extending in the axial direction, and
the torque transmitting member is provided in the slit.

19. A bicycle crank assembly comprising:
a sprocket having a rotational center axis;
a crank axle extending along the rotational center axis, the crank axle including an internal space;
a crank arm attached to the crank axle;
a movable member movably provided in the internal space to move the sprocket in an axial direction of the rotational center axis; and
a torque transmitting member to transmit a pedaling torque from the crank axle to the sprocket, the torque transmitting member being coupled to one of the crank axle and the movable member to be stationary with respect to the one of the crank axle and the movable member in the axial direction.

20. A bicycle crank assembly comprising:
a sprocket unit including a sprocket having a rotational center axis, the sprocket unit having a reference surface perpendicular to the rotational center axis;
a crank axle extending along the rotational center axis;
a crank arm including a pedal attachment end having an axially outermost surface; and
a movable member movably provided in an internal space of the crank axle to move the sprocket unit from an axially outward position to an axially inward position in an axial direction of the rotational center axis, the reference surface being positioned at an axial position equal to an axial position of the axially outermost surface in a state where the sprocket unit is at the axially outward position or being positioned axially inwardly from the axially outermost surface in the axial direction in the state where the sprocket unit is at the axially outward position.

* * * * *